(12) United States Patent
Kagawa et al.

(10) Patent No.: US 7,557,953 B2
(45) Date of Patent: Jul. 7, 2009

(54) IMAGE PROCESSING DEVICE AND IMAGE PROCESSING METHOD

(75) Inventors: Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 563 days.

(21) Appl. No.: 10/569,947

(22) PCT Filed: Jul. 23, 2004

(86) PCT No.: PCT/JP2004/010492

§ 371 (c)(1),
(2), (4) Date: Feb. 28, 2006

(87) PCT Pub. No.: WO2005/022460

PCT Pub. Date: Mar. 10, 2005

(65) Prior Publication Data

US 2007/0008556 A1    Jan. 11, 2007

(30) Foreign Application Priority Data

Aug. 29, 2003  (JP) ............................. 2003-305917
Oct. 14, 2003  (JP) ............................. 2003-353348

(51) Int. Cl.
*H04N 1/60* (2006.01)
(52) U.S. Cl. .................. 358/1.9; 358/518; 358/520; 382/162; 382/167
(58) Field of Classification Search ................. 358/1.9, 358/500, 518, 520; 382/162, 167
See application file for complete search history.

(56) References Cited

U.S. PATENT DOCUMENTS 5,739,922 A * 4/1998 Matama .................... 358/447

| | | | |
|---|---|---|---|
| 6,125,202 A | 9/2000 | Kagawa et al. | |
| 6,434,268 B1 | 8/2002 | Asamura et al. | |
| 6,865,292 B1 | 3/2005 | Kagawa et al. | |
| 7,251,053 B1 * | 7/2007 | Yoshida | 358/1.9 |
| 7,418,132 B2 * | 8/2008 | Hoshuyama | 382/167 |
| 2003/0016373 A1 * | 1/2003 | Asamura et al. | 358/1.9 |

FOREIGN PATENT DOCUMENTS

| JP | 63-39188 B2 | 8/1988 |
|---|---|---|
| JP | 3-205991 A | 9/1991 |
| JP | 11-308472 A | 11/1999 |
| JP | 2002-41025 A | 2/2002 |

* cited by examiner

*Primary Examiner*—Mark K Zimmerman
*Assistant Examiner*—Miya J Cato
(74) *Attorney, Agent, or Firm*—Birch, Stewart, Kolasch & Birch, LLP

(57) ABSTRACT

A purpose of the present invention is to provide an image processing apparatus and an image processing method capable of independently converting the frequency characteristics of particular hue components in a color image.

In an image processing apparatus for converting the frequency characteristics of first color data representing a color image and outputting second color data corresponding to the first color data, an image processing apparatus according to the present invention has a hue region data calculation means for using the first color data to calculate first hue region data valid for a plurality of particular hue components in the color image represented by the first color data, a frequency characteristic conversion means for converting the frequency characteristics of the first hue region data independently for each of the hue components and thereby outputting second hue region data, and means for calculating the second color data by using the second hue region data.

26 Claims, 33 Drawing Sheets

FIG.7
FIG.7 (A)
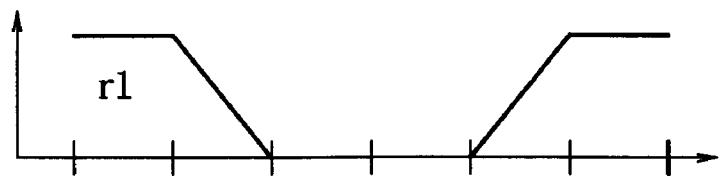
FIG.7 (B)
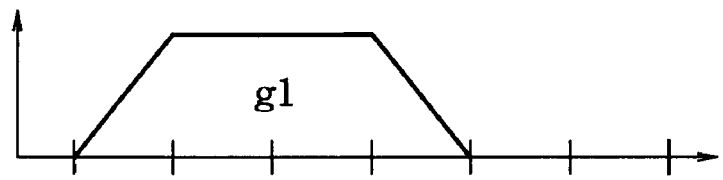
FIG.7 (C)
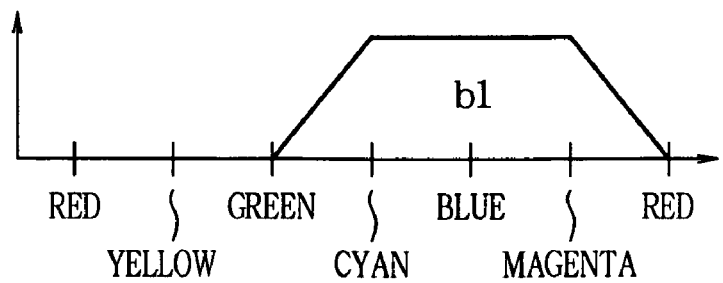

FIG.16

| IDENTIFYING CODE S1 | MAXIMUM VALUE β | MINIMUM VALUE α |
|---|---|---|
| 0 | Ri | Gi |
| 1 | Ri | Bi |
| 2 | Gi | Ri |
| 3 | Gi | Bi |
| 4 | Bi | Ri |
| 5 | Bi | Gi |
| 6 | Ri | Gi=Bi |
| 7 | Gi | Ri=Bi |
| 8 | Bi | Ri=Gi |
| 9 | Gi=Bi | Ri |
| 10 | Ri=Bi | Gi |
| 11 | Ri=Gi | Bi |
| 12 | Ri=Gi=Bi | Ri=Gi=Bi |

FIG.18

| IDENTIFYING CODE S1 | sfh1r | sfh1g | sfh1b | sfh1c | sfh1m | sfh1y |
|---|---|---|---|---|---|---|
| 0 | fh1r | 0 | 0 | 0 | fh1m | 0 |
| 1 | fh1r | 0 | 0 | 0 | 0 | fh1y |
| 2 | 0 | fh1g | 0 | fh1c | 0 | 0 |
| 3 | 0 | fh1g | 0 | 0 | 0 | fh1y |
| 4 | 0 | 0 | fh1b | fh1c | 0 | 0 |
| 5 | 0 | 0 | fh1b | 0 | fh1m | 0 |
| 6 | fh1r | 0 | 0 | 0 | 0 | 0 |
| 7 | 0 | fh1g | 0 | 0 | 0 | 0 |
| 8 | 0 | 0 | fh1b | 0 | 0 | 0 |
| 9 | 0 | 0 | 0 | fh1c | 0 | 0 |
| 10 | 0 | 0 | 0 | 0 | fh1m | 0 |
| 11 | 0 | 0 | 0 | 0 | 0 | fh1y |
| 12 | 0 | 0 | 0 | 0 | 0 | 0 |

FIG.30

| IDENTIFYING CODE S1 | h1p | h1q |
|---|---|---|
| 0 | fh1r | fh1m |
| 1 | fh1r | fh1y |
| 2 | fh1g | fh1c |
| 3 | fh1g | fh1y |
| 4 | fh1b | fh1c |
| 5 | fh1b | fh1m |
| 6 | fh1r | 0 |
| 7 | fh1g | 0 |
| 8 | fh1b | 0 |
| 9 | 0 | fh1c |
| 10 | 0 | fh1g |
| 11 | 0 | fh1b |
| 12 | 0 | 0 |

IMAGE PROCESSING DEVICE AND IMAGE PROCESSING METHOD

BACKGROUND OF THE INVENTION

1. Field of the Invention

This invention relates to an image processing apparatus and an image processing method for converting frequency characteristics of color image data in full-color printing equipment and related equipment such as printers, video printers, and scanners, image generating equipment for creating computer graphic images, or color display equipment, in accordance with the particular equipment used or conditions of use.

2. Description of the Related Art

Image data input to color image display equipment and the like generally consist of red (R), green (G), and blue (B) color data. The color data are generated by a camera or other image generating apparatus, but are subject to the effects of various types of noise in transmission, so the color data input to the image display equipment do not necessarily match the original color data. Processing such as removal of noise components is therefore performed at the image display equipment so that the original image can be reproduced.

Patent Document 1, listed below, gives an example of an image processing apparatus that smoothes an image. From input image data, the image processing apparatus described in this patent document distinguishes between light and dark parts of the image and carries out the smoothing process only on light parts that are adjacent to dark parts, to prevent an apparent thinning of lines when dark characters are displayed on a light background.

In addition to this type of image processing, color conversion processing is carried out to correct color data according to device characteristics so that desired color reproduction is obtained. Desired color reproduction means reproduction of colors that people will like, giving consideration to human perceptual characteristics and color memory, which is not necessarily the same thing as reproducing colors faithfully. Human color memory has a tendency to remember colors such as the color of the sky and the color of a green lawn as being more vivid, that is, brighter and more saturated, than they actually are. Processing is therefore performed to increase the brightness and saturation of particular color components such as these. Even when colors are reproduced faithfully, it is not unusual to perform processing to increase the brightness and saturation.

A feature of the color conversion apparatus described in Patent Document 2 below is that it performs color conversion processing by a matrix calculation on terms valid for six hue components in a color image: red, green, blue, yellow, magenta, and cyan. By appropriate selection of the matrix coefficients for the terms valid for these six hue components, it is possible to adjust the red, green, blue, yellow, magenta, and cyan hue components independently.

Patent Document 1: Japanese Patent Application Publication No. 2002-41025

Patent Document 2: Japanese Patent No. 3128429

DISCLOSURE OF THE INVENTION

Problems to be Solved by the Invention

Processing such as removal of noise components, which converts frequency characteristics, needs to be carried out for each color component of a color image. If the color data representing human skin color include noise components, for example, the skin appears wrinkled. In this situation, it would be desirable to remove the noise components included only in the skin color region. Conventional noise removal processing, however, is carried out uniformly on all of the R, G, and B color data, so the same frequency components as the noise components are removed from colors in which noise is not conspicuous, with results such as blurring of the image. Or if the original image has few changes (has only low frequency components) in the red region but changes markedly (has high-frequency components) in the blue region, then if noise components are introduced into the red region in the transmission process, they will be extremely conspicuous and image quality will suffer. In this situation, it would be desirable to remove the noise components only from the red region, without removing noise components from the blue region.

The viewer perceives a color image as a combination of color (light) stimuli displayed on the basis of the R, G, and B color data, but the magnitude of the noise perceived by the viewer differs according to the hue; due to human perceptual characteristics, there are hues in which noise is readily perceptible and hues in which noise is not readily perceptible. Accordingly, carrying out similar noise removal for all hues could not be said to be appropriate.

If processing to enhance the saturation or brightness of color data including noise components is carried out, the saturation or brightness of the noise components is enhanced together with the saturation or brightness of the intended color data. Processing to enhance the saturation or brightness of color data is therefore problematic when the color data include noise components, because the effect of the noise is further emphasized and image quality is degraded. Passing the color data through a noise removal means to reduce the effect of noise components included in the color data before input to the color conversion means is also problematic because, although the noise components are removed, high-frequency components constituting edges are lost as well, causing the image to become blurred.

The present invention addresses the problems above, with the object of providing an image processing apparatus and an image processing method capable of independently converting the frequency characteristics of particular hue components in a color image.

Another object is to provide an image processing apparatus and an image processing method capable of adjusting the saturation and brightness of desired color components without emphasizing noise components.

Means of Solution of the Problems

In an image processing apparatus for converting the frequency characteristics of first color data representing a color image and outputting second color data corresponding to the first color data, an image processing apparatus according to the present invention comprises:

a hue region data calculation means for using the first color data to calculate first hue region data valid for a plurality of particular hue components in the color image represented by the first color data;

a frequency characteristic conversion means for converting the frequency characteristics of the first hue region data independently for each of the hue components and thereby outputting second hue region data; and means for calculating the second color data by using the second hue region data.

The image processing method according to the present invention converts the frequency characteristics of first color data representing a color image and outputs second color data corresponding to the first color data by:

using the first color data to calculate first hue region data valid for a plurality of particular hue components in the color image represented by the first color data;

converting the frequency characteristics of the first hue region data independently for each of the hue components and thereby outputting second hue region data; and calculating the second color data by using the second hue region data.

Effect of the Invention

Because the image processing apparatus and method according to the present invention use the first color data to calculate first hue region data valid for a plurality of particular hue components in the color image represented by the first color data, convert the frequency characteristics of the first hue region data independently for each of the hue components and thereby output second hue region data, and calculate the second color data by using the second hue region data, they can control the frequency characteristics of the first color data independently for each hue component.

BRIEF DESCRIPTION OF THE DRAWINGS

FIGS. 7(A) to 7(C) schematically show relationships between hues and second chromatic color component data.

FIG. 16 shows relationships between identification code S1 and the first color data.

FIG. 18 shows an example of relationships between identification code S1 and selected second hue region data.

FIG. 30 shows the relationship between an identification code and selected terms.

Figure 1:
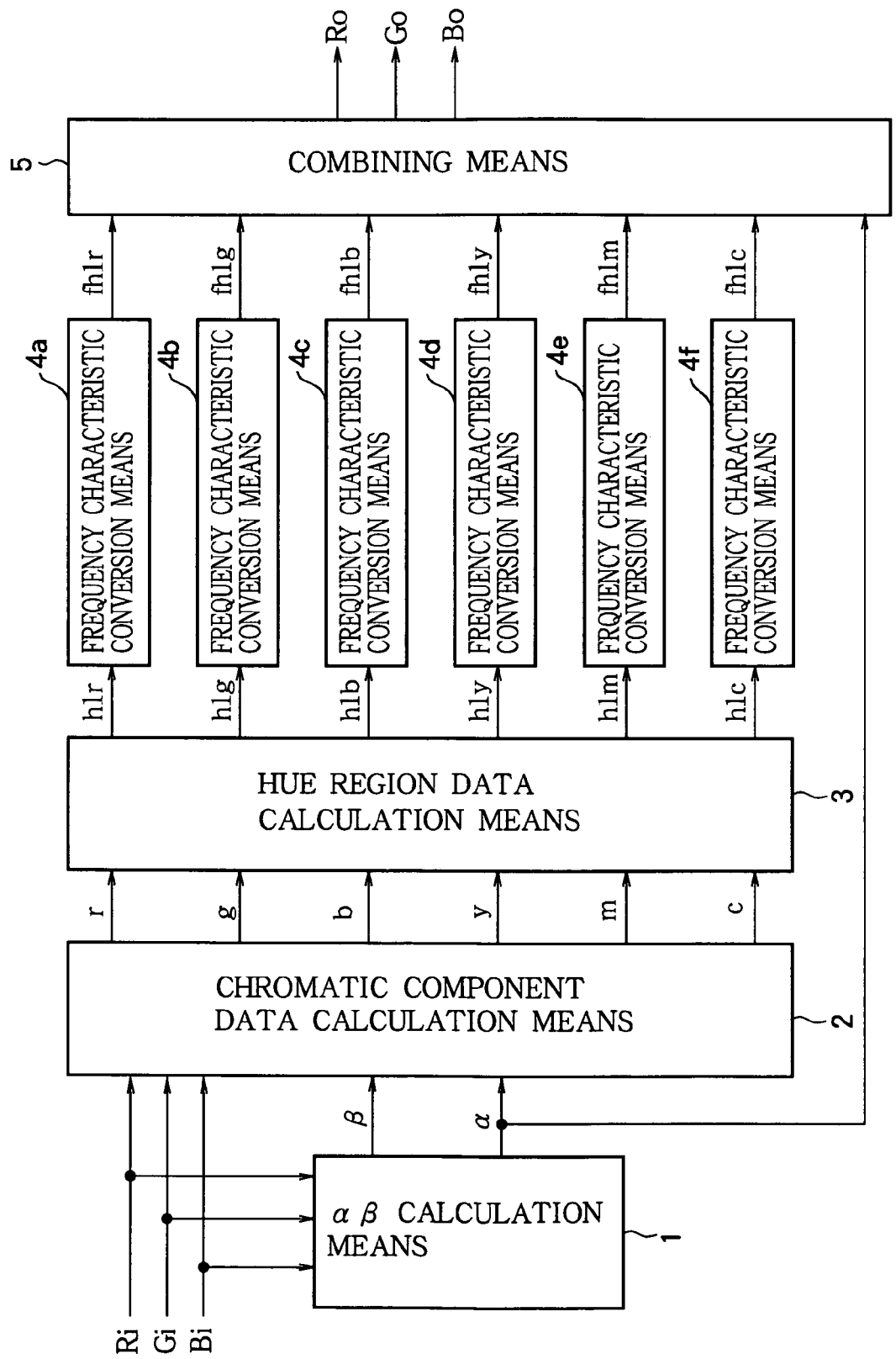
FIG. 1 is a block diagram illustrating the structure of an image processing apparatus according to a first embodiment.

EXPLANATION OF REFERENCE CHARACTERS 1, 1a $\alpha\beta$ calculation means, 2 chromatic component data calculation means, 3 hue region data calculation means, 4a-4g frequency characteristic conversion means, 5, 5b combining means, 6a-6f minimum value selection means, 7a-7h data cells, 8 data shifting means, 9, 9a-9f weighted addition means, 10a-10f addition means, 11 data selection means, 15 achromatic component data noise removal means, 17, 17b coefficient generating means, 18, 18a, 18b matrix calculation means, 19 color correction calculation section, 20 color correction addition means

BEST MODE OF PRACTICING THE INVENTION

Image processing apparatus according to the present invention will be described specifically below with reference to the drawings.

First Embodiment

FIG. 1 is a block diagram illustrating an embodiment of an image processing apparatus according to this invention. As shown in FIG. 1, an image processing apparatus according to this invention comprises an $\alpha\beta$ calculation means 1, a chromatic component data calculation means 2, a hue region data calculation means 3, frequency characteristic conversion means 4a to 4f, and a combining means 5.

First color data Ri, Gi, Bi representing a color image are input to the $\alpha\beta$ calculation means 1 and chromatic component data calculation means 2. The $\alpha\beta$ calculation means 1 selects and outputs the maximum value $\beta$ and the minimum value $\alpha$ of the first color data Ri, Gi, Bi. The output maximum value $\beta$ and minimum value $\alpha$ are input to the chromatic component data calculation means 2. The minimum value $\alpha$ is also input to the combining means 5. The minimum value $\alpha$ expresses the size of the achromatic (gray) component in the first color data Ri, Gi, Bi.

The chromatic component data calculation means 2 calculates the chromatic component data r, g, b, y, m, and c representing the magnitudes of the red, green, blue, yellow, magenta, and cyan color (chromatic) components left after the achromatic component has been removed from the colors represented by the first color data, on the basis of the first color data Ri, Gi, Bi and the maximum value $\beta$ and minimum value α output from the αβ calculation means 1. These chromatic data are obtained by subtraction (r=Ri−α, g=Gi−α, b=Bi−α, y=β−Bi, m=β−Gi, c=β−Ri).

FIG. 5(A) to FIG. 5(F) schematically show the magnitudes of chromatic component data y, m, c, r, g, b in the six hues red, yellow, green cyan, blue, and magenta. As shown, each item of the chromatic component data assumes a maximum value at three of the six hues and assumes a value of zero at the remaining three hues. Chromatic component data c, for example, assumes the maximum value at hues of green, cyan, and blue, decreases in magnitude from green to yellow and from blue to magenta, and assumes a value of zero at red, yellow, and magenta.

A property of the chromatic component data obtained as above is that at least one of r, g, and b and at least one of y, m, and c assumes a value of zero. If the maximum value β is Ri and the minimum value α is Gi (β=Ri, α=Gi), for example, from the above subtraction processes, g is zero and c is zero; if the maximum value β is Ri and the minimum value α is Bi (β=Ri, α=Bi), then b is zero and c is zero. Depending on the maximum-minimum combination of Ri, Gi, Bi, that is, a total of at least two values, including at least one of r, g, and b and at least one of y, m, and c assume a value of zero.

Figure 2:
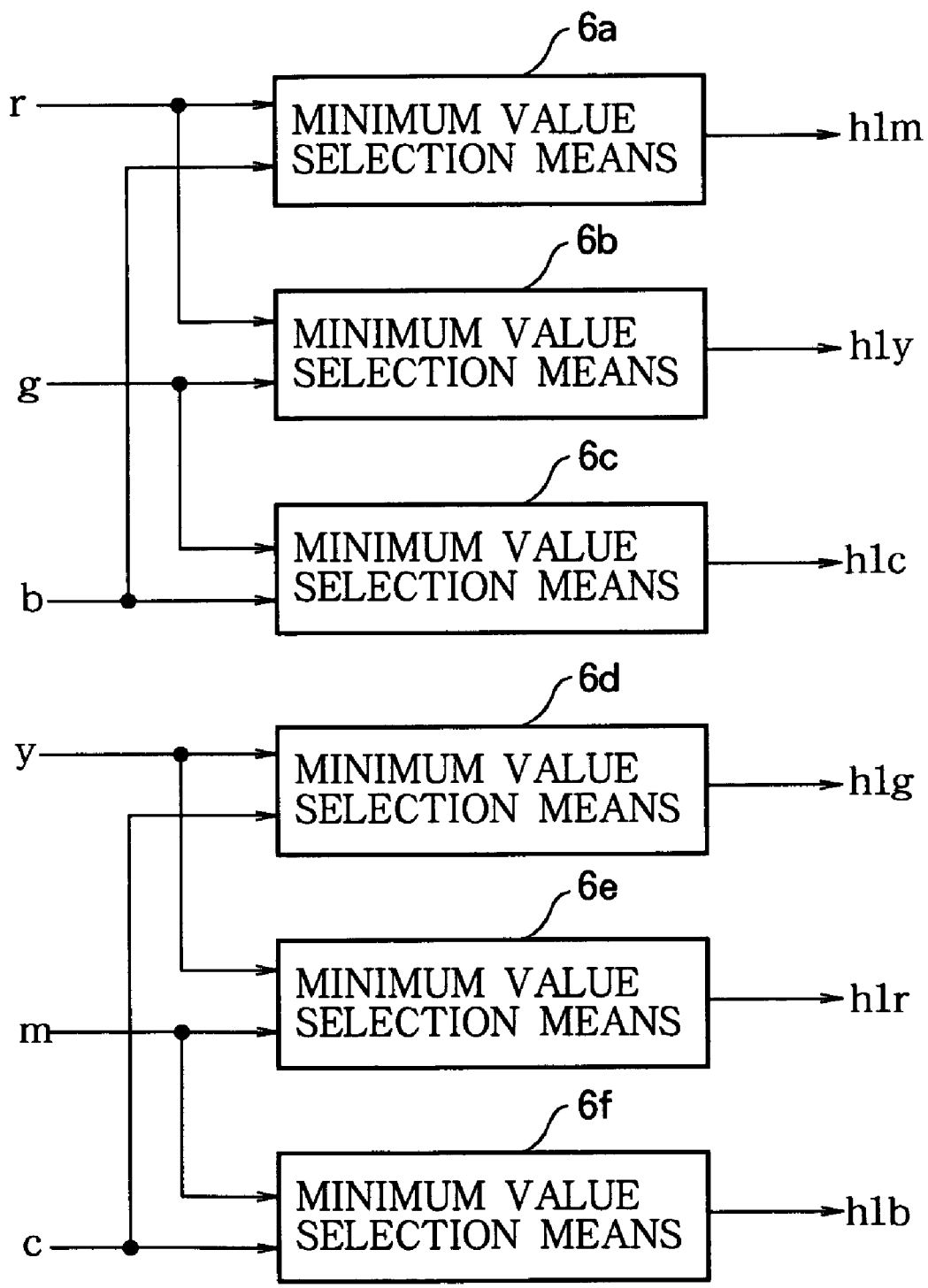
FIG. 2 is a block diagram showing an exemplary structure of the hue region data calculation means 3 in the image processing apparatus according to the first embodiment.

The six items of chromatic component data r, g, b, y, m, c output from the chromatic component data calculation means 2 are sent to the hue region data calculation means 3. FIG. 2 is a block diagram showing an example of the internal structure of the hue region data calculation means 3. The hue region data calculation means 3 has a plurality of minimum value selection means 6a to 6f that select and output the smaller value of two input chromatic component data values.

Minimum value selection means 6a selects the smaller of the r and b chromatic component data values and outputs it as hue region data h1m. Similarly, minimum value selection means 6b selects the smaller of the r and g chromatic component data values and outputs it as hue region data h1y; minimum value selection means 6c selects the smaller of the g and b chromatic component data values and outputs it as hue region data h1c; minimum value selection means 6d selects the smaller of the y and c chromatic component data values and outputs it as hue region data h1g; minimum value selection means 6e selects the smaller of the y and m chromatic component data values and outputs it as hue region data h1r; minimum value selection means 6f selects the smaller of the m and c chromatic component data values and outputs it as hue region data h1b.

The calculations of hue region data h1r, h1g, h1b, h1c, h1m, h1y can be represented by the following equations (1), in which min(A, B) represents the smaller of A and B.

$$h1r = \min(y, m)$$
$$h1g = \min(y, c)$$
$$h1b = \min(m, c)$$
$$h1c = \min(g, b)$$
$$h1m = \min(r, b)$$
$$h1y = \min(r, g) \quad (1)$$

FIGS. 6(A) to 6(F) schematically shows the relationships between hue region data h1r, h1y, h1g, h1c, h1b, h1m and the six hues red, yellow, green, cyan, blue, and magenta. As shown in these drawings, the hue region data h1r, h1g, h1b, h1c, h1m, h1y assume their maximum values at red, green, blue, cyan, magenta, and yellow, respectively, and assume a value of zero at the remaining hues. That is, it can be said that hue region data h1r, h1g, h1b, h1c, h1m, h1y are valid for the red, green, blue, cyan, magenta, and yellow hue components in the color image represented by the first color data.

For example, if Ri=W., Gi=0, and Bi=0, where W is a constant value, then the first color data represent a color with a red hue. In this case, the chromatic component data are r=W, g=b=0, y=m=W, c=0. Accordingly, h1r=min(y, m)=W, and the remaining five items of hue region data h1g, h1b, h1y, h1m, h1c are all zero. This means that h1r=min(y, m) is the only valid hue region data for the red hue. Similarly, h1g=min (c, y), h1b=min(m, c) h1c=min(g, b), h1m=min(b, r), and h1y=min(r, g) are the valid hue region data for green, blue, cyan, magenta, and yellow, respectively.

The hue region data h1r, h1g, h1b, h1y, h1m, h1c calculated by the hue region data calculation means 3 are input to the frequency characteristic conversion means 4a, 4b, 4c, 4d, 4e, 4f. The frequency characteristic conversion means 4a to 4f convert the spatial and/or temporal frequency characteristics of the input hue region data and output converted hue region data fh1r, fh1g, fh1b, fh1c, fh1m, fh1y.

The frequency conversion characteristics of the frequency characteristic conversion means 4a, 4b, 4c, 4d, 4e, 4f are set separately for input hue region data h1r, h1g, h1b, h1y, h1m, h1c. To remove noise in color components relating to a particular hue, for example, the frequency characteristic conversion means receiving hue region data corresponding to the particular hue are configured as a filter that removes (attenuates) the frequency components in which the noise components reside.

To reproduce a smooth image, the frequency characteristic conversion means comprises a low-pass filter that blocks or attenuates the high-frequency components of the input hue region data and passes the low frequency components. To emphasize edges in the image, the frequency characteristic conversion means comprises a filter that emphasizes edges or high-frequency components in the input hue region data.

The removal of noise components from the hue region data received by a frequency characteristic conversion means will now be described. In this case, the conversion characteristic of the frequency characteristic conversion means is determined according to the characteristics of the noise components included in the hue region data. The noise may be white noise with a wide range of frequency components, from low to high, or noise having strong components at certain frequencies, generated by carrier or other effects in transmission.

For noise having strong components at certain frequencies, the frequency characteristic conversion means is configured as a filter that removes or attenuates those frequency components. If the noise components included in the image data are white noise, the frequency characteristic conversion means is configured as a filter that removes or attenuates those of the noise components that are particularly noticeable to the eye. The exact frequency components that are noticeable are determined by the pixel spacing of the display equipment, the viewing distance, and other factors, but it is generally true of image display equipment that noise components are observed at frequencies close to the pixel frequency of the image data. Pixel frequency here means the frequency produced when the data for a continuous series of pixels vary in a fashion such as 0, 1, 0, 1, 0 . . . , for example, which is equivalent to half the clock frequency of the image data. Given the pixel spacing of typical currently available image display equipment, it is desirable to remove noise components in which adjacent pixel data change frequently and independently of each other, as this is highly conspicuous.

As described above, when noise is removed from image data by the frequency characteristic conversion means 4a to 4f, the filter characteristics are determined according to the frequency bands of the noise components to be removed. The case in which noise components at high frequencies close to the pixel frequency of the image data are removed by the frequency characteristic conversion means 4a to 4f will now be described. In this case, the frequency characteristic conversion means 4a to 4f may comprise a low-pass filter that blocks or attenuates high-frequency components in the image data and passes low frequency components. Specifically, they should comprise a low-pass filter that blocks or attenuates frequency components in the region above approximately two ninths (²/₄.₅) of the pixel frequency, that is, above one ninth of the clock frequency of the pixel data. A simple example is a low-pass filter that calculates the simple average value of a plurality of continuous pixels. In this case, the filter characteristics are determined by the number of pixels included in the simple average value.

Figure 3:
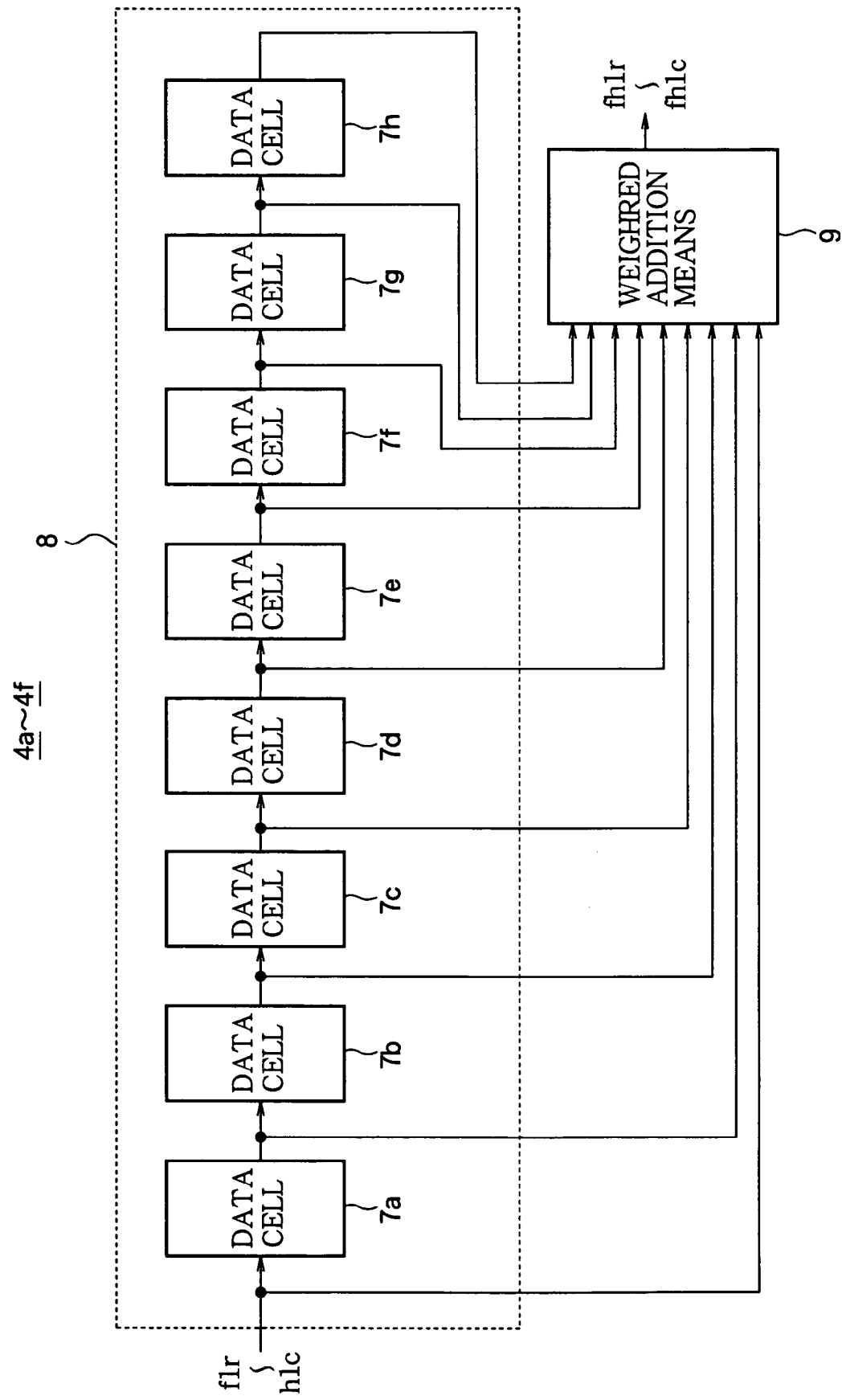
FIG. 3 is a block diagram showing an exemplary structure of the frequency characteristic conversion means 4a in the image processing apparatus according to the first embodiment.

FIG. 3 is a block diagram showing the internal structure of the frequency characteristic conversion means 4a to 4f. As shown in FIG. 3, the frequency characteristic conversion means 4a to 4f each have a data shifting means 8 consisting of a plurality of data cell 7a to 7h and a weighted addition means 9. Hue region data h1r, h1g, h1b, h1y, h1m, h1c input to the frequency characteristic conversion means 4a to 4f are sent in each case to data cell 7a. The data cells 7a to 7h are interconnected in series, and every time hue region data are input, the data in each of the data cells 7a to 7h simultaneously shift to the next stage and are output to the weighted addition means 9.

It will be assumed that when the first data value is input to the data shifting means 8, the same value is input to data cells 7a to 7h simultaneously. It will also be assumed that when the last data value has been input to the data shifting means 8, data cells 7a to 7h continue to receive the same value thereafter.

The weighted addition means 9 performs weighted addition of the data output from data cells 7a to 7h, and outputs the result as the converted hue region data fh1r, fh1g, fh1b, fh1y, fh1m, or fh1c. If even weighting is performed in the weighted addition means 9, that is, if identical weighting coefficients are used, a simple average value is calculated. The converted hue region data fh1r calculated by frequency characteristic conversion means 4a, for example, is represented by the following equation.

$$fh1r=f(h1r[n+4], h1r[n+3], h1r[n+2], h1r[n+1], h1r[n], h1r[n-1], h1r[n-2], h1r[n-3], h1r[n-4]) \quad (2)$$

In equation (2) above, h1r[n] represents the n-th input hue region data and the function f represents the weighted addition of the data h1r[n+4] ... h1r[n-4] output from the data cells 7a to 7h.

The other converted hue region data fh1g, fh1b, fh1c, fh1m, fh1y can be represented by equations similar to equation (2).

The converted hue region data fh1r, fh1g, fh1b, fh1c, fh1m, fh1y are input to the combining means 5 together with the minimum value α. The combining means 5 calculates the second color data Ro, Go, Bo by combining the converted hue data and the minimum value α.

Figure 4:
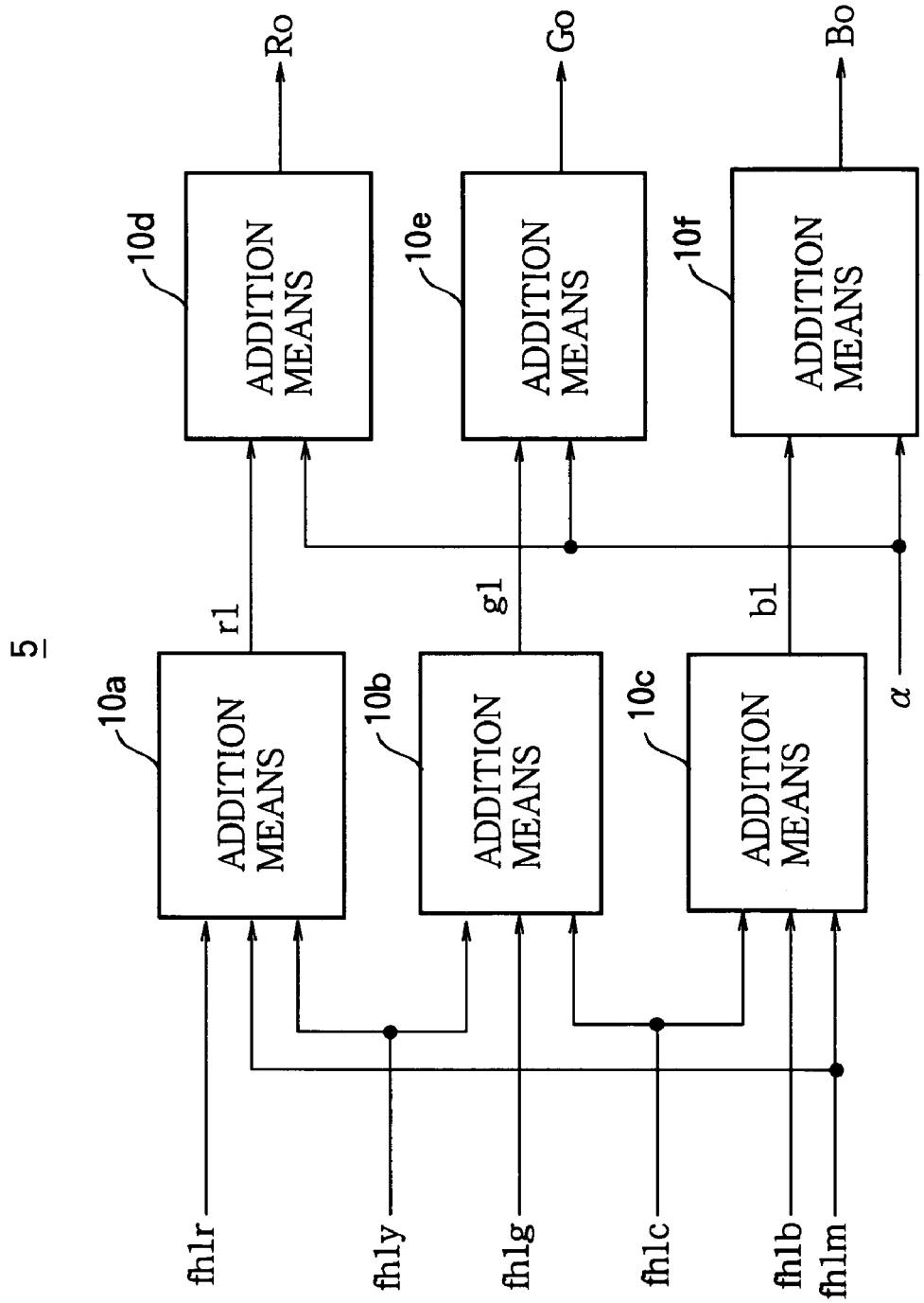
FIG. 4 is a block diagram showing an exemplary structure of the combining means 5 in the image processing apparatus according to the first embodiment.
Figure 5A:
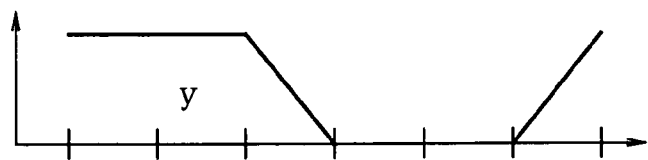
FIGS. 5(A) to 5(F) schematically show relationships between hues and first chromatic color component data.
Figure 5B:
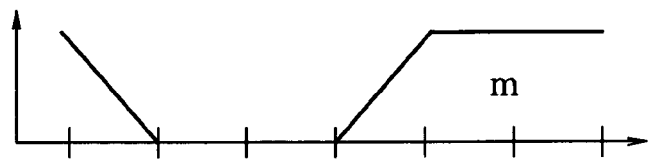
Figure 5C:
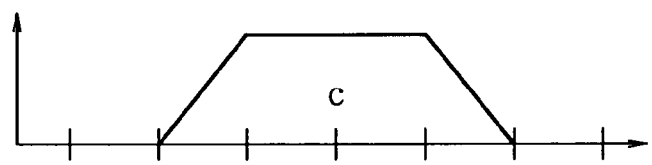
Figure 5D:
Figure 5E:
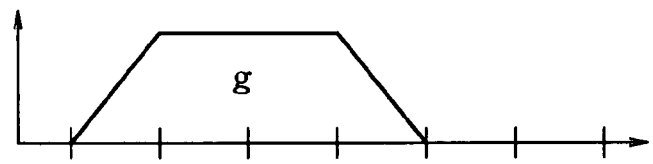
Figure 5F:
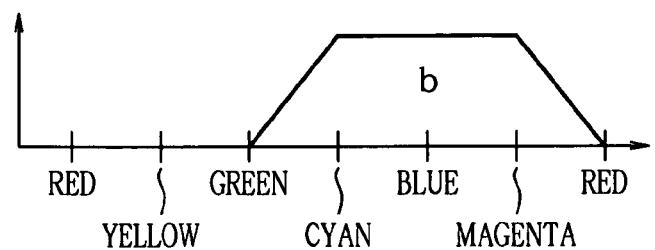
Figure 6A:
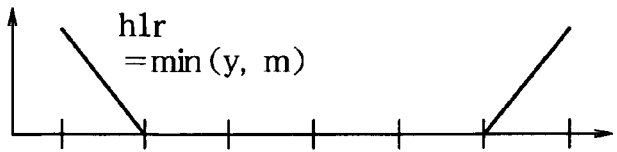
FIGS. 6(A) to 6(F) schematically show relationships between the hues and hue region data.
Figure 6B:
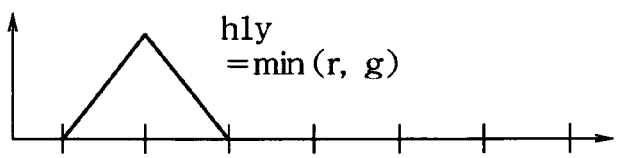
Figure 6C:
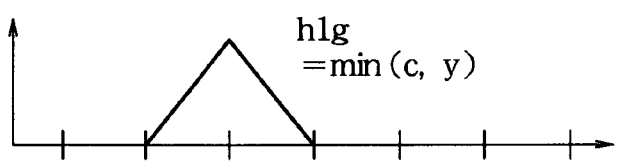
Figure 6D:
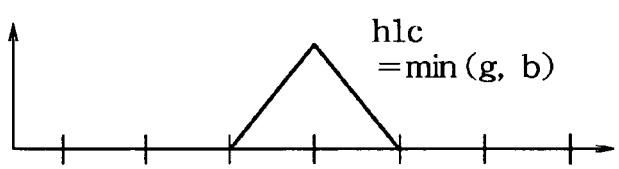
Figure 6E:
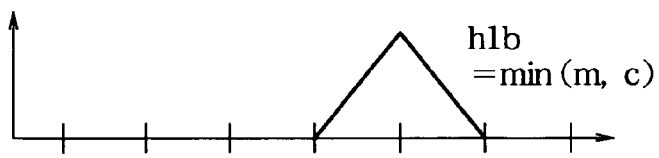
Figure 6F:
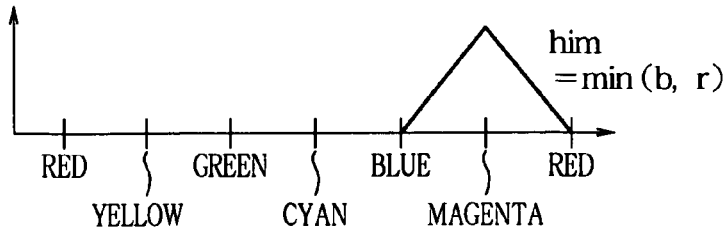

FIG. 4 is a block diagram showing the internal structure of the combining means 5. As shown in FIG. 4, the combining means 5 comprises addition means 10a to 10f. Addition means 10a adds converted hue region data fh1r, fh1y, fh1m to calculate converted chromatic component data r1; addition means 10b adds converted hue region data fh1g, fh1y, fh1c to calculate converted chromatic component data g1; addition means 10c adds converted hue region data fh1b, fh1c, fh1m to calculate converted chromatic component data b1; addition means 10d adds the minimum value α to converted chromatic component data r1 to calculate second color data Ro; addition means 10e adds the minimum value α to converted chromatic component data g1 to calculate second color data Go; addition means 10f adds the minimum value α to converted chromatic component data b1 to calculate second color data Bo.

The above operations in the combining means 5 are represented by the following equations.

$$Ro=fh1r+fh1m+fh1y+\alpha$$

$$Go=fh1g+fh1y+fh1c+\alpha$$

$$Bo=fh1b+fh1c+fh1m+\alpha \quad (3)$$

FIGS. 7(A) to 7(C) schematically show the six hues and the converted chromatic component data r1, g1, b1. For simplicity, the converted chromatic component data r1, g1, b1 shown in FIGS. 7(A) to 7(C) do not reflect the effect of frequency characteristic conversion in the frequency characteristic conversion means 4a to 4f. That is, it is assumed that the converted chromatic component data are identical to the r, g, and b chromatic component data (fh1r=h1r, fh1g=h1g, fh1b=h1b, fh1c=h1c, fh1m=h1m, fh1y=h1y), so the second color data Ro, Go, Bo obtained by addition of the minimum value α are identical to the first color data.

As described above, the invented image processing apparatus calculates the second color data by combining the converted hue region data fh1r, fh1g, fh1b, fh1y, fh1m, fh1c obtained by performing separate frequency conversions of the hue region data h1r, h1g, h1b, h1y, h1m, h1c respectively valid for the hue components red, green, blue, yellow, magenta, and cyan, so the frequency characteristics of the red, green, blue, yellow, magenta, and cyan hue components can each be converted individually.

The operation of the frequency characteristic conversion means 4a to 4f will now be described. The first color data Ri, Gi, Bi are affected by various noise in the course of transmission. If the original sizes of the first color data components are Rs, Gs, Bs and the sizes of the respective noise components are Rn, Gn, Bn, then the first color data Ri, Gi, Bi input to the image display apparatus are represented by the sums of the original color data component sizes Rs, Gs, Bs and the noise component sizes Rn, Gn, Bn (Ri=Rs+Rn, Gi=Gs+Gn, Bi=Bs+Bn).

Figure 8:
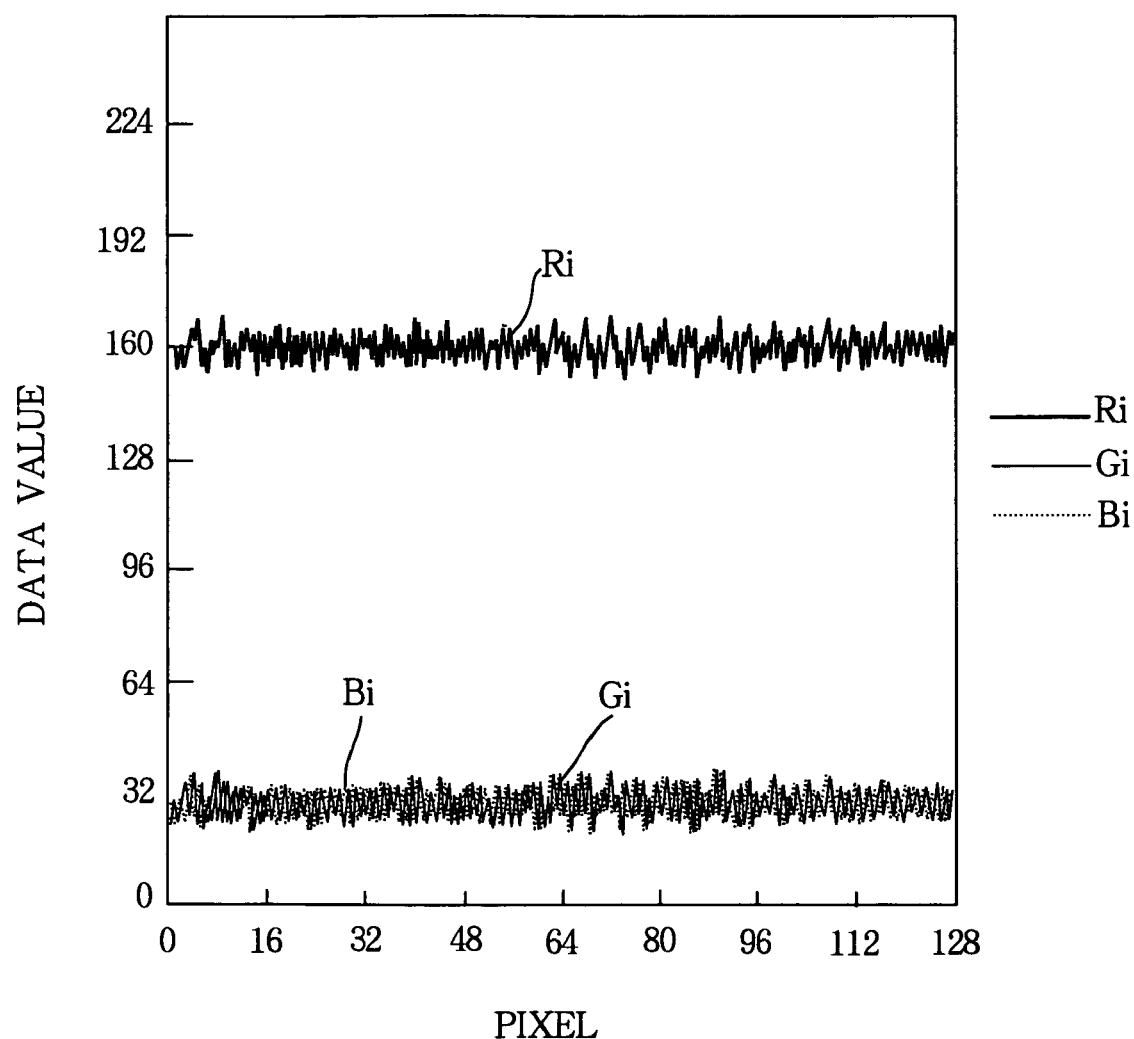
FIG. 8 shows exemplary first color data.

FIG. 8 shows exemplary sizes of the first color data Ri, Gi, Bi input to the image processing apparatus. In FIG. 8, the horizontal axis represents pixel positions and the vertical axis represents the values of the first color data Ri, Gi, Bi at each pixel position. The original first color data Ri, Gi, Bi shown in FIG. 8 have component sizes Rs=160, Gs=32, Bs=32 (including a gray component) at all pixel positions, and represent uniform red. The first color data Ri, Gi, Bi input to the image processing apparatus, however, are not uniform, due to the effects of noise components Rn, Gn, Bn.

It will now be assumed that frequency characteristic conversion means 4a removes noise from hue region data h1r and frequency characteristic conversion means 4b to 4f do not remove noise from hue region data h1g, h1b, h1y, h1m, h1c, which they output unchanged. That is, it is assumed the weighted addition means 9 in frequency characteristic conversion means 4a calculates a simple average value and the weighted addition means 9 in each of frequency characteristic conversion means 4b to 4f performs no weighted addition at all. In this case, only the converted hue region data fh1r valid for the red hue component reflect the effect of frequency characteristic conversion.

Figure 9:
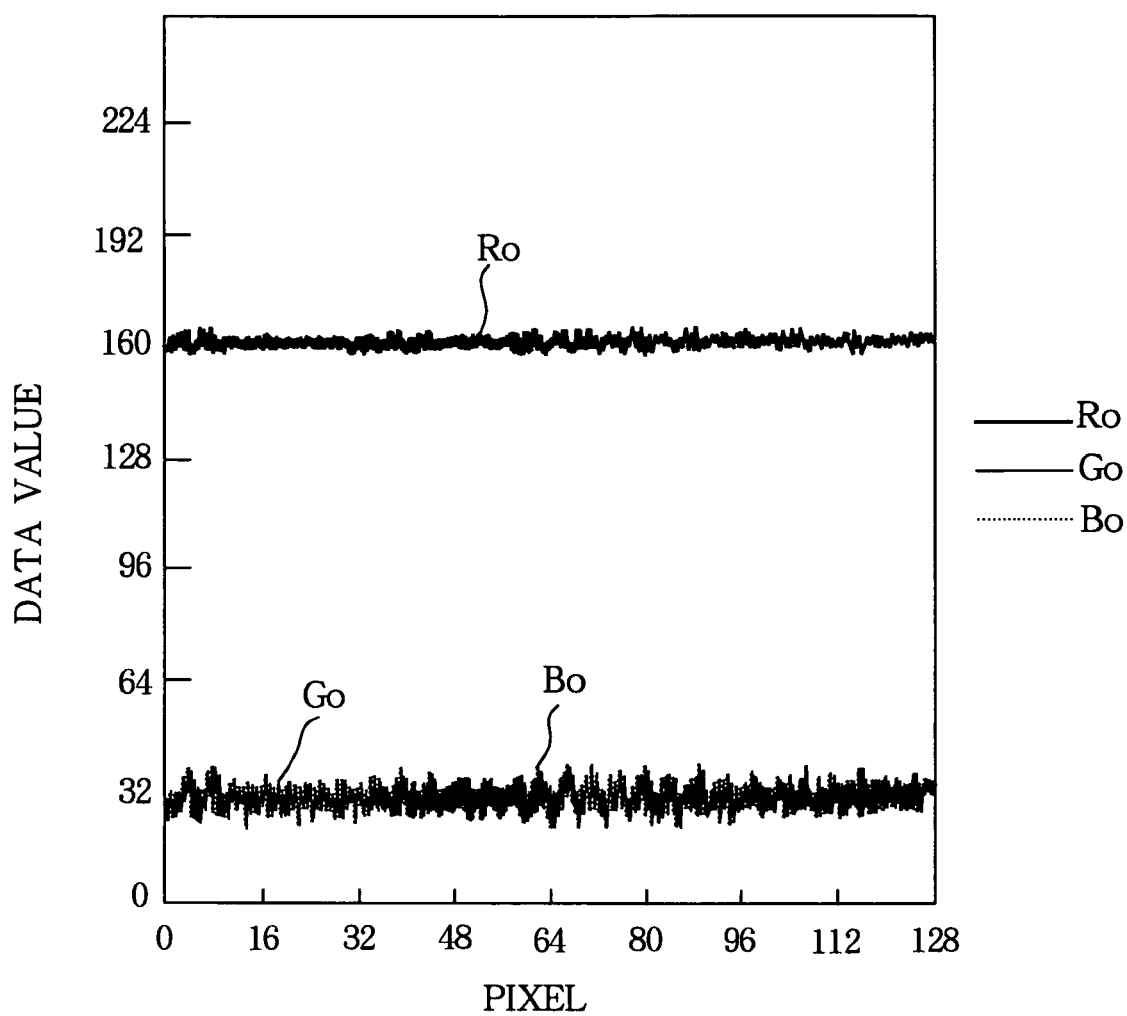
FIG. 9 shows exemplary second color data.

FIG. 9 shows the second color data Ro, Go, Bo calculated by performing the above processing for the first color data Ri, Gi, Bi in FIG. 8. From FIG. 9, it can be seen that among the second color data Ro, Go, Bo, the effect of the noise components on Ro is reduced; the effect of the noise components on Go and Bo remains unchanged. This is because the characteristics of the frequency characteristic conversion means 4a to 4f are determined so that the effect of frequency characteristic conversion is reflected only on the hue region data h1r valid for the red hue component. Noise is thereby removed only from the hue region data h1r valid for the red hue component in the frequency characteristic conversion means 4a, which makes it possible to remove noise exclusively from the red hue component without affecting the adjacent yellow and magenta hue components.

Similarly, if the weighted addition means 9 in the frequency characteristic conversion means 4b is set with weighting coefficients such that noise is removed from the hue region data valid for the green hue component and the remaining frequency characteristic conversion means 4a and 4c to 4f do not remove noise from the input hue region data h1r, h1b, h1y, h1m h1c but output the data unchanged, then the effect of noise components only on the second color data Go can be reduced. In this case, the frequency characteristic conversion means 4b removes noise only from the hue region data h1g valid for the green hue component, which makes it possible to remove noise exclusively from the green hue component without affecting the adjacent yellow and cyan hue components.

As described above, since the invented image processing apparatus generates hue region data h1r, h1y, h1g, h1c, h1b, him valid for the red, yellow, green, cyan, blue, and magenta hue components of the first color data and performs frequency characteristic conversion processing for each of the hue region data individually, the frequency characteristics of the first color data can be separately controlled for each of the red, yellow, green, cyan, blue, and magenta hue components. This makes it possible to remove noise components only from certain hues, without affecting the frequency characteristics of other hues, when the effect of noise components is conspicuous only in those certain hues or when it is desired to remove noise components only from those certain hues. Noise components included in human skin color are observed as wrinkles, for example. The noise components present in the skin color can be removed by removing noise from the red and/or yellow hue region data.

When the red hue component in the original image has few variations (few high-frequency components) and the blue hue component has many variations (many high-frequency components), if high-frequency noise components are mixed into the red hue component, the noise is very conspicuous. In this case, the noise can be removed effectively by removing noise components only from the hue region data h1r valid for the red hue component.

In addition, one characteristic of human perception is that it is very sensitive to variations in some colors and not so sensitive to variations in other colors. Image data generally consist of red, green, and blue color data with noise components added to each of the three colors. Even if the magnitudes of the noise components added to each color are identical, the noise magnitudes perceived by the viewer differ according to the hue, depending on human perceptual characteristics, so there are hues in which the noise is readily perceptible and hues in which the noise is not readily perceptible. With the image processing apparatus of this embodiment, a visually superior image can be obtained by taking human perceptual characteristics into consideration to determine the characteristics with which noise is removed from each color component.

The weighting coefficients in the weighted addition means 9 in the frequency characteristic conversion means 4a to 4f of the image processing apparatus of this embodiment can be changed flexibly to set appropriate conversion characteristics. The image processing apparatus of this embodiment is configured so that frequency characteristic conversion means are provided for all hue region data, but to reduce the size of the apparatus, it can be configured with a frequency characteristic conversion means provided only for the hue region data valid for hue components of interest.

The image processing apparatus of this embodiment is configured so that the frequency characteristic conversion means 4a to 4f operate on the hue region data of adjacent pixels to perform spatial frequency characteristic conversion, but it may be configured to perform temporal frequency characteristic conversion. That is, a memory means for storing several screens of hue region data may be provided and operations may be carried out on the hue region data for the same pixel in several preceding and following screens, making it possible also to perform temporal frequency characteristic conversion separately for each hue.

Second Embodiment

Figure 10:
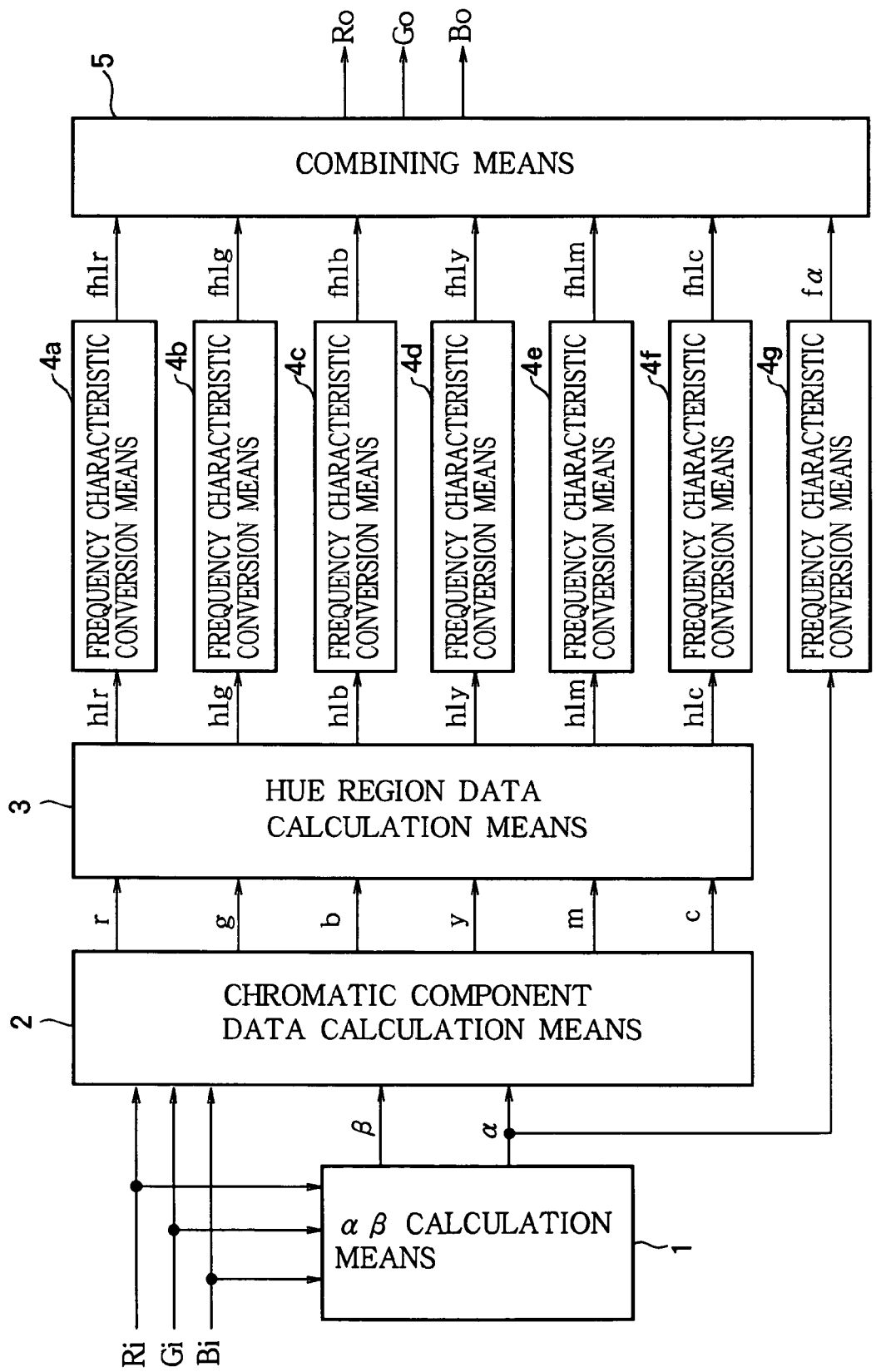
FIG. 10 is a block diagram illustrating the structure of an image processing apparatus according to a second embodiment.

FIG. 10 is a block diagram showing another embodiment of the invented image processing apparatus. As shown in FIG. 10, the image processing apparatus according to this embodiment further comprises a frequency characteristic conversion means 4g for processing the minimum value $\alpha$ representing the size of the achromatic component in the first color data Ri, Gi, Bi. Other elements are the same as in the image processing apparatus according to the first embodiment shown in FIG. 1.

Frequency characteristic conversion means 4g performs conversion of spatial or temporal frequency characteristics of the minimum value $\alpha$, and outputs the converted minimum value $f\alpha$. Frequency characteristic conversion means 4g can be configured in the same way as the other frequency characteristic conversion means 4a to 4f shown in FIG. 3, and operates as a noise removal means, a low-pass filter, an edge enhancing means, or a high-frequency enhancing means depending on the values set as weighting coefficients.

As mentioned above, the minimum value $\alpha$ represents the size of the achromatic component in the first color data Ri, Gi, Bi. Accordingly, in the frequency characteristic conversion means 4g, the frequency characteristics of the achromatic component are converted.

The image processing apparatus according to this embodiment can use the frequency characteristic conversion means 4a to 4f to convert the frequency characteristics of the first color data for each hue region and can also perform a separate frequency characteristic conversion of the achromatic component.

Third Embodiment

Figure 11:
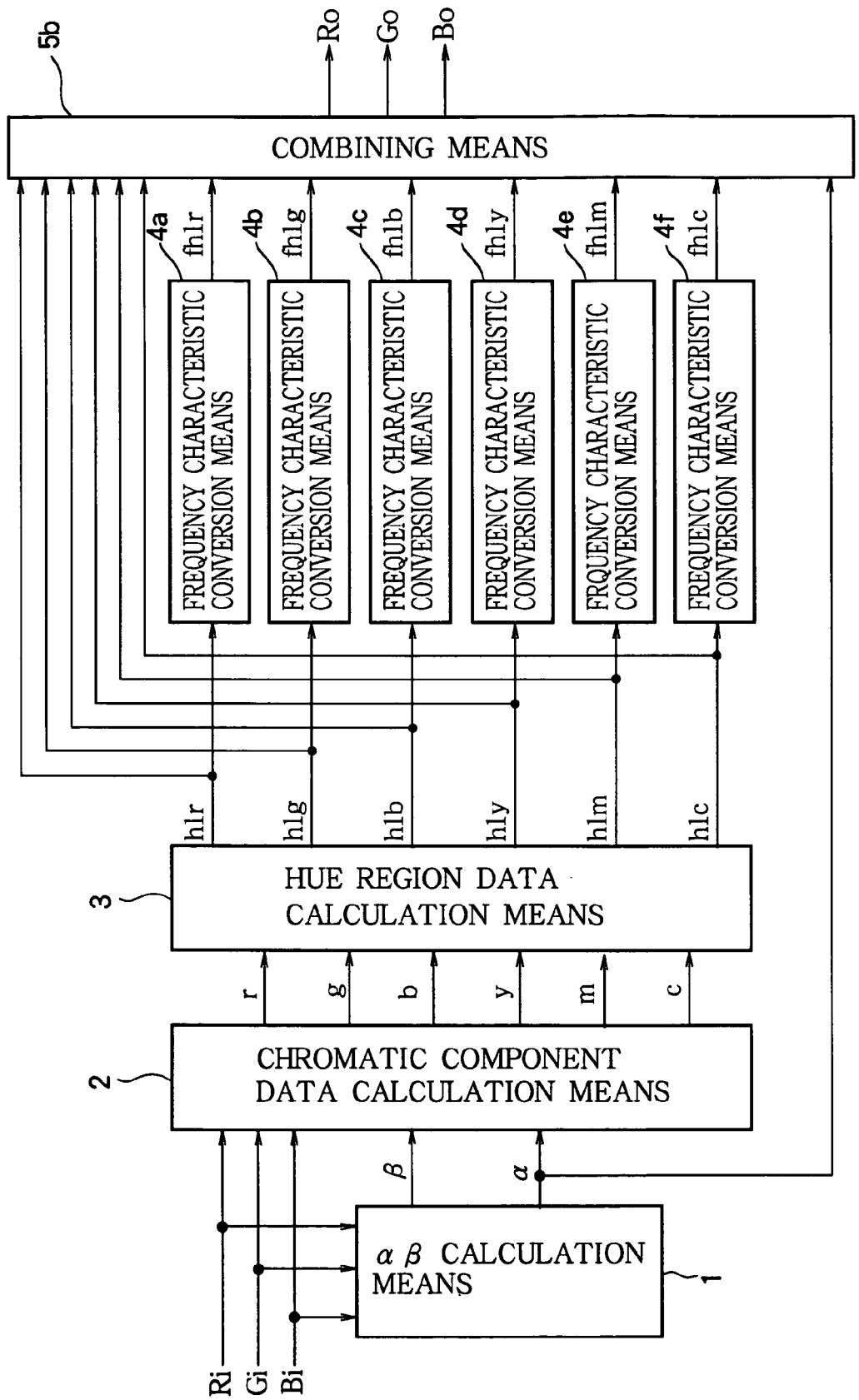
FIG. 11 is a block diagram illustrating the structure of an image processing apparatus according to a third embodiment.

FIG. 11 is a block diagram showing another embodiment of the invented image processing apparatus. In the image processing apparatus shown in FIG. 11, besides the converted hue region data fh1r, fh1g, fh1b, fh1c, fh1m, fh1y and the minimum value $\alpha$, the hue region data h1r, h1g, h1b, h1c, h1m, h1y are input to the combining means 5b. The combining means 5b generates second color data Ro, Go, Bo by weighted addition of the converted hue data and hue region data. Other elements are the same as in the image processing apparatus according to the first embodiment shown in FIG. 1.

Figure 12:
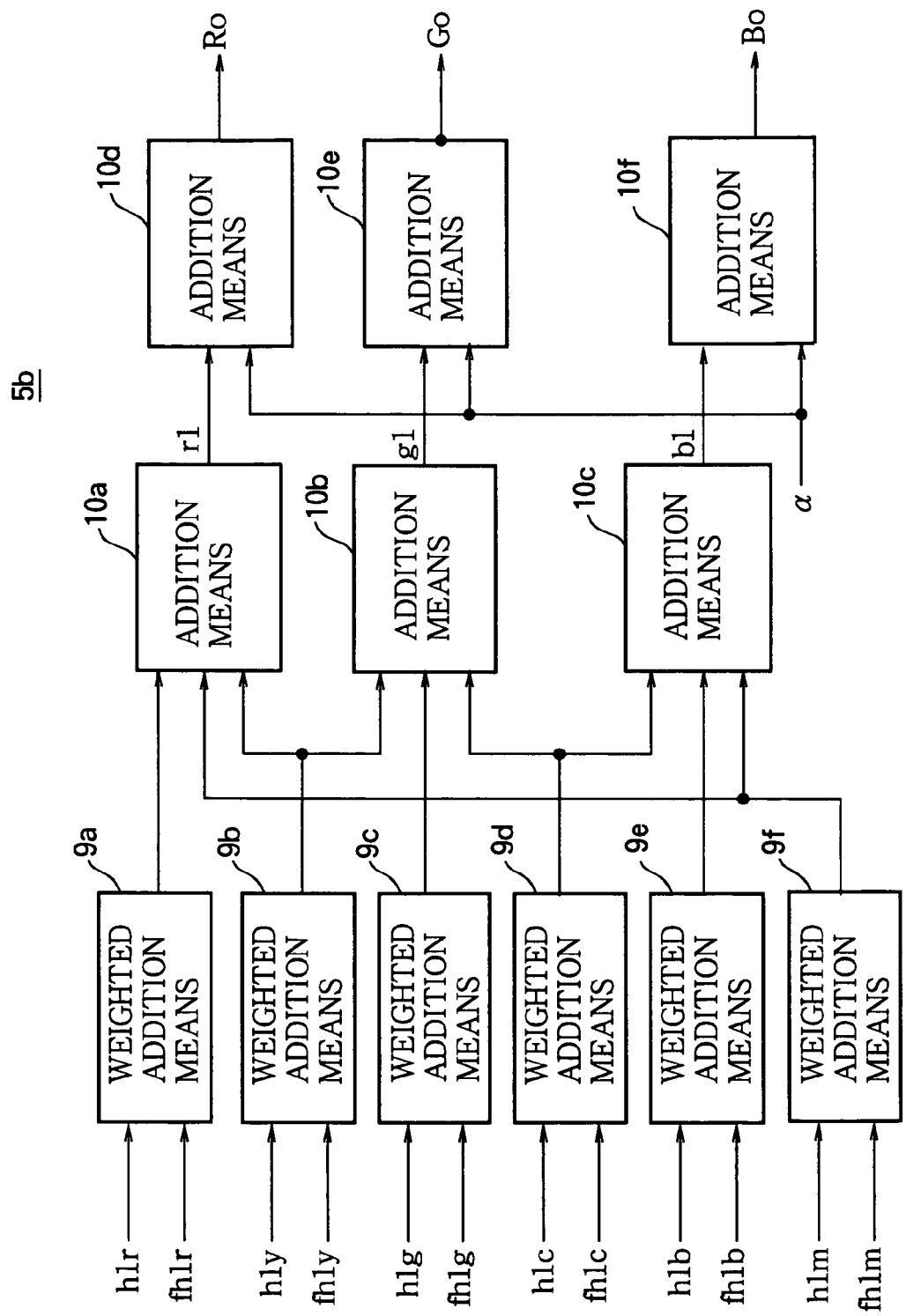
FIG. 12 is a block diagram showing an exemplary structure of the combining means 5b in the image processing apparatus according to the third embodiment.

FIG. 12 is a block diagram showing the internal structure of the combining means 5b. The weighted addition means 9a to 9f perform weighted addition of hue region data and converted hue region data. Specifically, weighted addition means 9a performs weighted addition of hue region data h1r and converted hue region data fh1r; weighted addition means 9b performs weighted addition of hue region data h1y and converted hue region data fh1y; weighted addition means 9c performs weighted addition of hue region data h1g and converted hue region data fh1g; weighted addition means 9d performs weighted addition of hue region data h1c and converted hue region data fh1c; weighted addition means 9e performs weighted addition of hue region data h1b and converted hue region data fh1b; weighted addition means 9f performs weighted addition of hue region data h1m and converted hue region data fh1m.

Addition means 10a adds the outputs from weighted addition means 9a, 9b, and 9f to calculate converted chromatic component data r1. Addition means 10b adds the outputs from weighted addition means 9b, 9c, and 9d to calculate converted chromatic component data g1. Addition means 10c adds the outputs from weighted addition means 9d, 9e, and 9f to calculate converted chromatic component data b1.

Addition means 10d adds the minimum value α to converted chromatic component data r1 to calculate second color data Ro. Addition means 10e adds the minimum value α to converted chromatic component data g1 to calculate second color data Go. Addition means 10d adds the minimum value α to converted chromatic component data r1 to calculate second color data Bo.

The above operations in the combining means 5 are represented by the following equations.

$$Ro = (kr \times fh1r + (1 - kr) \times h1r) +$$
$$(km \times fh1m + (1 - km) \times h1m) + (ky \times fh1y + (1 - ky) \times h1y) + \alpha$$
$$Go = (kg \times fh1g + (1 - kg) \times h1g) + (ky \times fh1y + (1 - ky) \times h1y) +$$
$$(kc \times fh1c + (1 - kc) \times h1c) + \alpha$$
$$Bo = (kb \times fh1b + (1 - kb) \times h1b) + (kc \times fh1c + (1 - kc) \times h1c) +$$
$$(km \times fh1m + (1 - km) \times h1m) + \alpha +$$
$$(km \times fhlm + (1 - km) \times hlm) + \alpha$$

(4)

In the above equations, kr, kg, kb, kc, km, ky are weighting coefficients with values greater than or equal to 0 and less than or equal to 1.

The effect of the weighted addition of the hue region data and converted hue region data in the combining means 5b will now be described.

Figure 13:
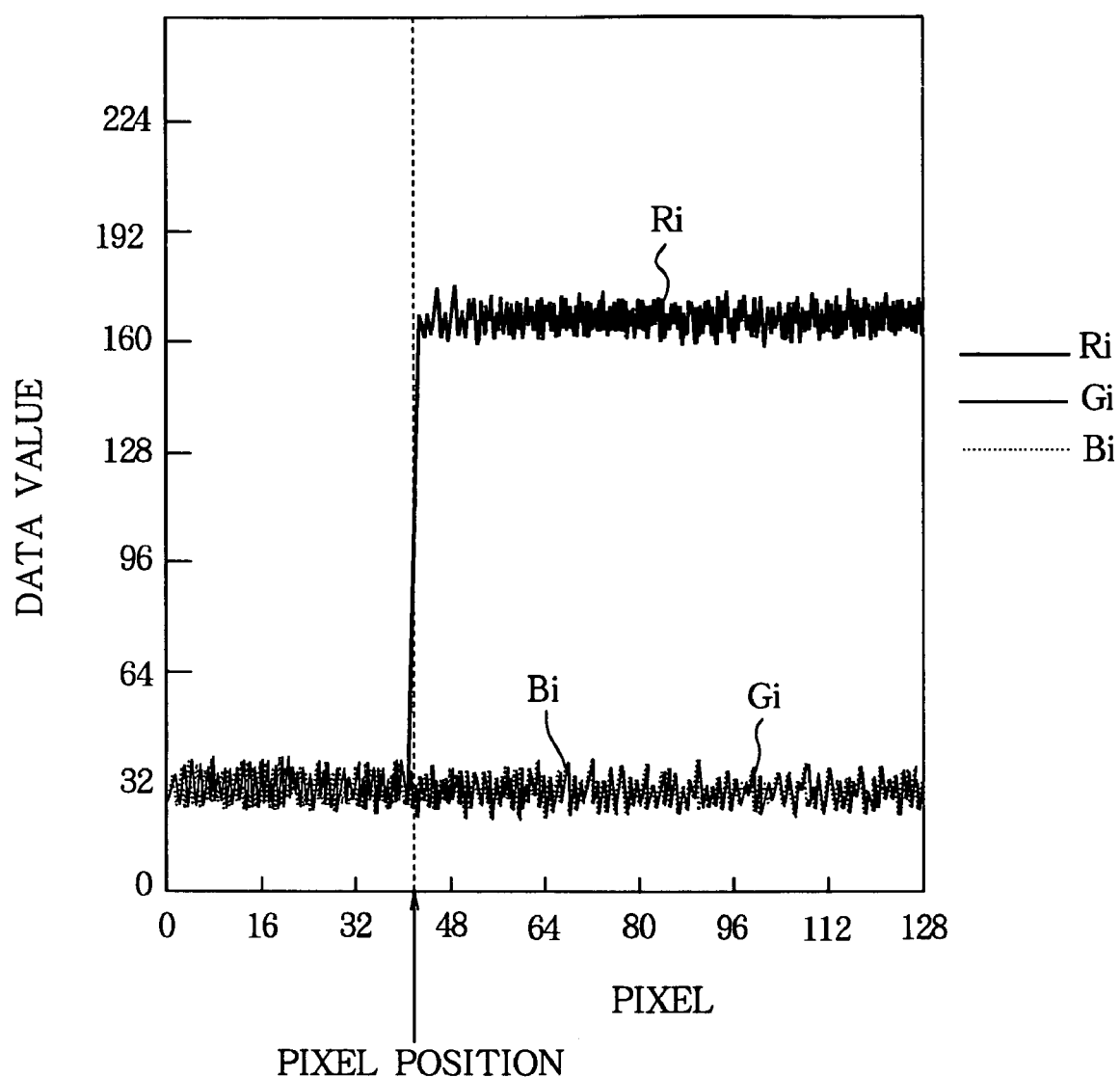
FIG. 13 shows exemplary first color data.

FIG. 13 shows exemplary first color data Ri, Gi, Bi input to the image processing apparatus in this embodiment (FIG. 11). In FIG. 13, the horizontal axis represents pixel positions of the first color data and the vertical axis represents the values of the first color data. The original first color data have component sizes Rs=32, Gs=32, Bs=32 at pixel positions 0 to 42, representing uniform gray, and Rs=160, Gs=32, Bs=32 at pixel positions after 42, representing uniform red including a gray component. The first color data Ri, Gi, Bi, however, are not uniform due to effects of noise components, as shown in FIG. 13.

It will now be assumed that frequency characteristic conversion means 4a removes noise from hue region data h1r and frequency characteristic conversion means 4b to 4f do not remove noise from hue region data h1g, h1b, h1y, h1m, h1c, which they output unchanged. That is, it is assumed the weighted addition means 9 in frequency characteristic conversion means 4a calculates a simple average value and the weighted addition means 9 in each of frequency characteristic conversion means 4b to 4f performs no weighted addition at all. In this case, only the converted hue region data valid for the red hue component reflect the effect of frequency characteristic conversion.

Figure 14:
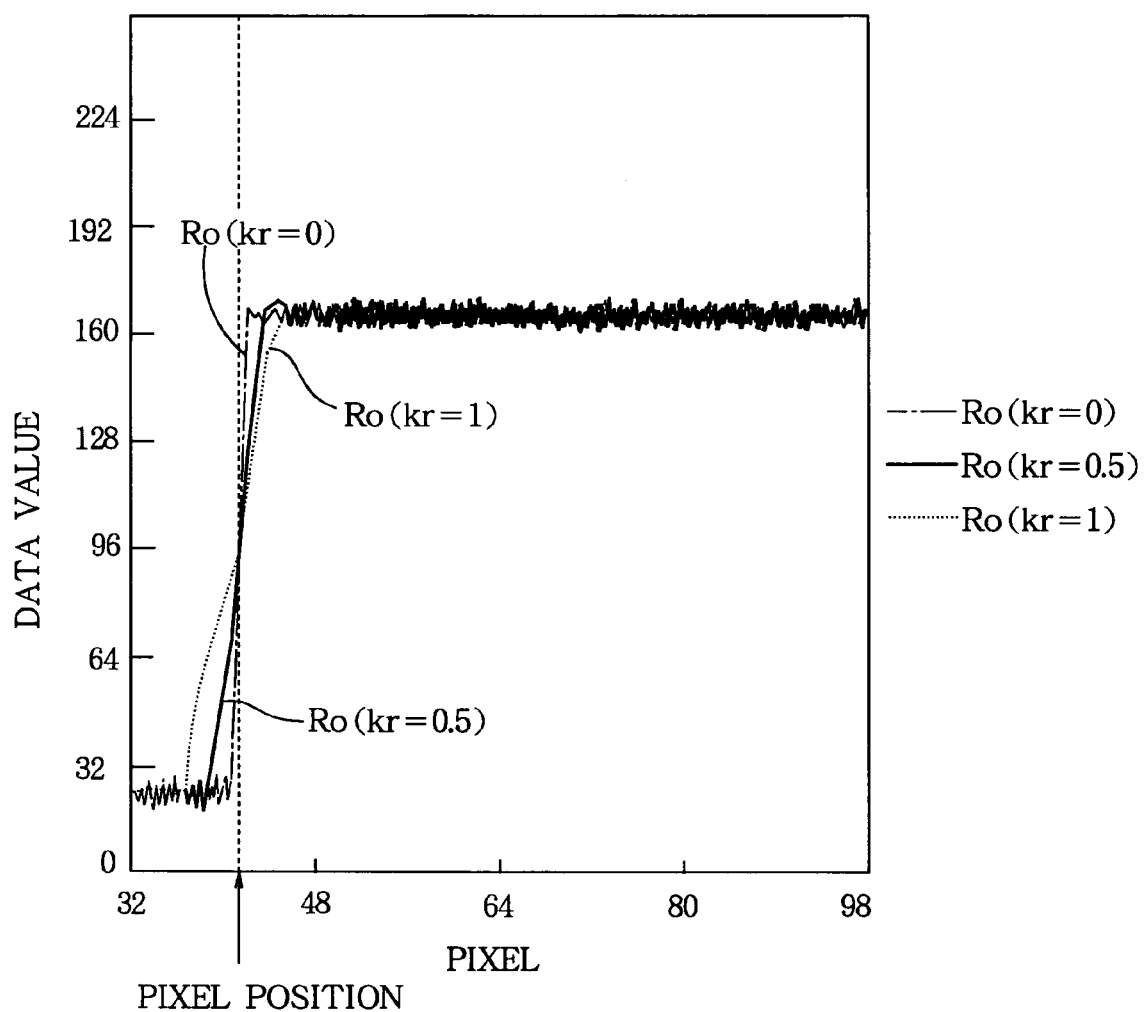
FIG. 14 shows exemplary second color data.

FIG. 14 shows the second color data Ro, Go, Bo calculated by performing the above processing for the first color data Ri, Gi, Bi shown in FIG. 8, where weighting coefficient kr in the combining means 5 in the weighted addition means 9a shown in FIG. 12 is set to values of 0, 0.5, 1. From FIG. 14 it can be seen that the slope in the varying section of second color data Ro changes as weighting coefficient kr changes. That is, when kr=1, the variation in the boundary section becomes comparatively gradual, causing color leakage due to which the originally gray part preceding pixel position 42 is tinged with red. When kr=0.5, color leakage in the part preceding pixel position 42 is reduced. When kr=0, the same appearance is obtained as when no frequency characteristic conversion is performed.

As described above, as the value of weighting coefficient kr is reduced, reducing the weight of converted hue region data fh1r in relation to the weight of hue region data h1r, the effect of frequency characteristic conversion is reduced. Accordingly, it is also possible to adjust the degree of frequency characteristic conversion for each hue by setting the conversion characteristics in the frequency characteristic conversion means 4a to 4f to identical values and giving the combining means 5b a different weighting coefficient for each hue.

As described above, the image processing apparatus according to this embodiment can adjust the value of the weighting coefficients in the combining means 5b to adjust the degree of color leakage to the other hues without changing conversion characteristics in the frequency characteristic conversion means. In addition, the combining means 5b can be set with weighting coefficients varied for each hue to adjust the degree of the effect of frequency. characteristic conversion.

Fourth Embodiment

Figure 15:
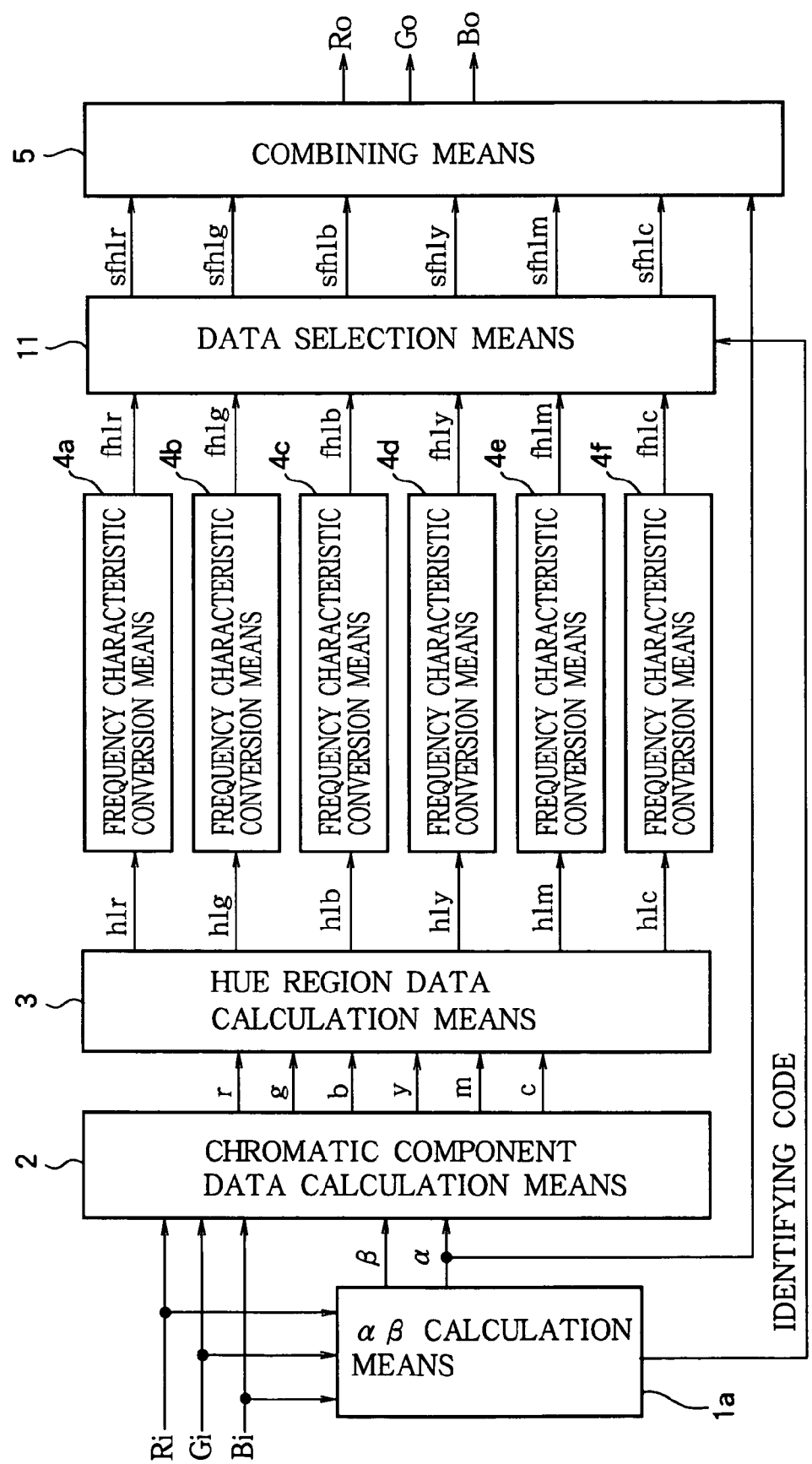
FIG. 15 is a block diagram showing the structure of an image processing apparatus according to a fourth embodiment.

FIG. 15 is a block diagram showing another embodiment of the invented image processing apparatus. As shown in FIG. 15, the image processing apparatus according to this embodiment comprises a data selection means 11 following the frequency characteristic conversion means 4a to 4f. The αβ calculation means 1a selects and outputs the maximum value β and the minimum value α of the first color data Ri, Gi, Bi, and outputs an identifying code S1 giving information about the hue represented by the first color data Ri, Gi, Bi.

FIG. 16 shows the relationships between the value of identifying code S1, and the maximum and minimum values β, α of the first color data Ri, Gi Bi. As shown in FIG. 16, the identifying codes S1 of 0 to 12 identify different combinations of the maximum and minimum values β, α a of data Ri, Gi, Bi. These codes identify hue information in the first color data according to the relationship between the maximum and minimum values β, α. For example, when the maximum value β is Ri and the minimum value α is both Gi and Bi (Gi =Bi), the first color data represent a red hue.

Figure 17:
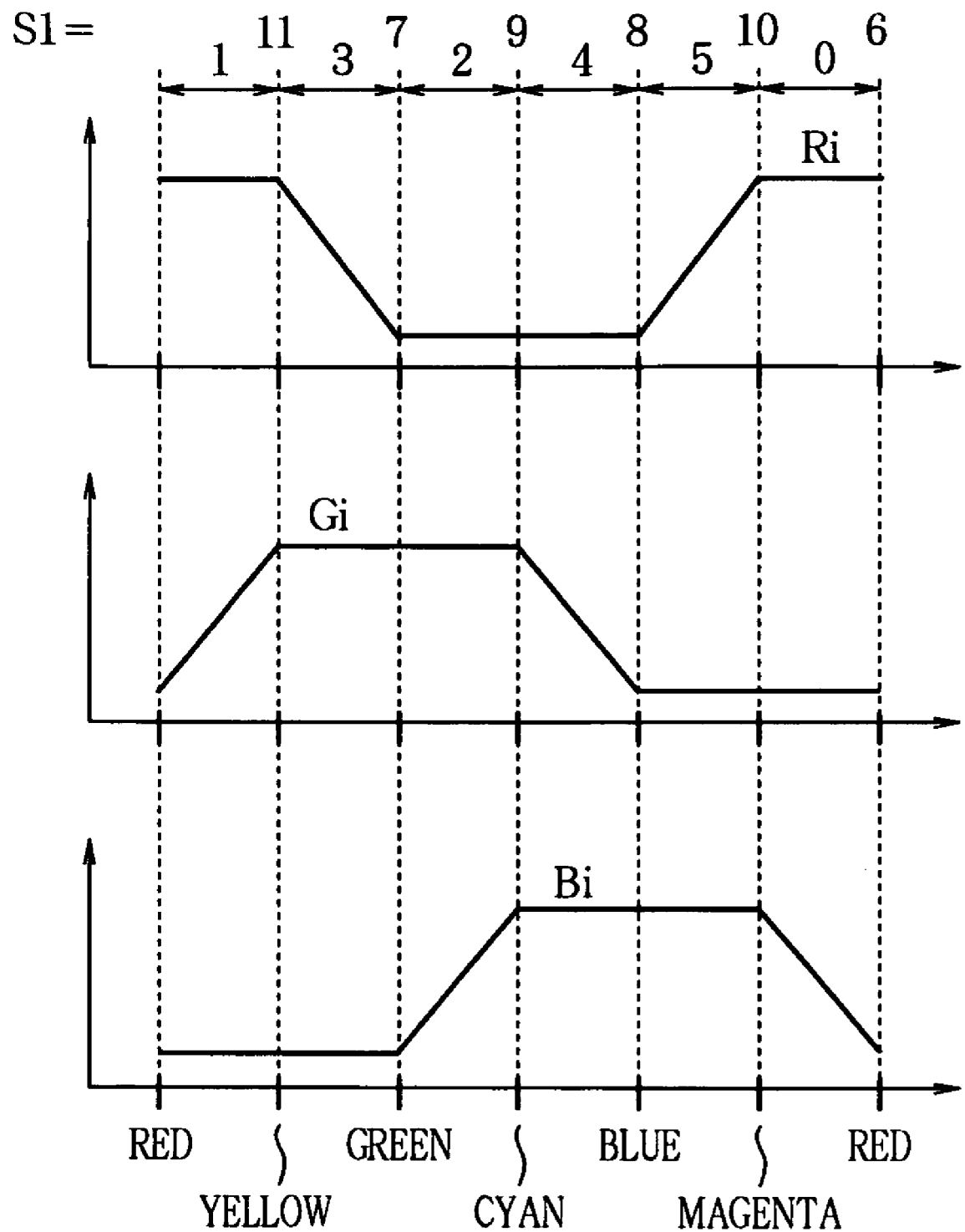
FIG. 17 shows relationships between hue and the value of identification code S1.

FIG. 17 shows the relationship between the identifying code S1, the sizes of the first color data Ri, Gi, Bi, and the different hue components. As shown, when the combination of first color data Ri, Gi, Bi represents a hue between red and yellow, an identifying code equal to one (S1=1) is output. Similarly, S1=3 is output for hues between yellow and green, S1=2 for hues between green and cyan, S1=4 for hues between cyan and blue, S1=5 for hues between blue and magenta, and S1=0 for hues between magenta and red. When the combination of the first color data Ri, Gi, Bi represents a red hue, S1=6 is output. Similarly, S1=11 is output for yellow, S1=7 for green, S1=8 for cyan, S1=9 for blue, and S1=10 for magenta.

When Ri=Gi=Bi, the first color data represent an achromatic gray, for which identifying code S1=12 is output.

Identifying code S1 is output to the data selection means 11. The data selection means 11 selects converted hue region data fh1$r$, fh1$g$, fh1$b$, fh1$c$, fh1$m$, fh1$y$ according to the value of identifying code S1 and outputs the selected converted hue region data sfh1$r$, sfh1$g$, sfh1$b$, sfh1$c$, sfh1$m$, sfh1$y$.

FIG. 18 indicates which of the converted hue region data fh1$r$, fh1$g$, fh1$b$, fh1$c$, fh1$m$, fh1$y$ are selected according to the identifying code S1. When S1=1, for example, the combination of the first color data Ri, Gi, Bi represents a hue between red and yellow, and accordingly, only the hue region data h1$r$ valid for the red hue component and the hue region data h1$y$ valid for the yellow hue component should take non-zero values; the other hue region data fh1$g$, fh1$b$, fh1$c$, fh1$m$ should be zero.

Converted data that should be zero in a given hue region, however, may have non-zero values due to noise removal processing (simple averaging operation in the weighted addition means 9) in the frequency characteristic conversion means 4$a$ to 4$f$. If converted data that should be zero in a given hue region become non-zero, color leakage occurs. To prevent this problem, the data selection means 11 selects converted hue region data according to the value of identifying code S1 so that converted hue region data that should inherently be zero actually become zero. That is, when identifying code S1 is one (S1=1), the data selection means 11 selects the hue region data h1$r$ valid for the red hue component and hue region data h1$y$ valid for the yellow hue component, outputs fh1$r$ as the selected data sfh1$r$ (sfh1$r$=fh1$r$), outputs fh1$y$ as the selected data sfh1$y$ (sfh1$y$=fh1$y$), and outputs zero for the other hue region data (sfh1$g$=sfh1$b$=sfh1$c$=sfh1$m$=0). Similarly, when the identifying code is six (S1=6), the data selection means 11 selects the converted hue region data h1$r$ valid for the red hue component and outputs it as sfh1$r$ (sfh1$r$=fh1$r$), all the other output converted hue region data having a value of zero (sfh1$y$=sfh1$g$=sfh1$b$=sfh1$c$=sfh1$m$=0).

The combining means 5 performs the operations represented by the following equations on the selected converted hue region data sfh1$r$, sfh1$g$, sfh1$b$, sfh1$c$, sfh1$m$, sfh1$y$ and the minimum value α to calculate the second color data Ro, Go, Bo.

$$Ro = sfh1r + sfh1m + sfh1y + \alpha$$

$$Go = sfh1g + sfh1y + sfh1c + \alpha$$

$$Bo = sfh1b + sfh1c + sfh1m + \alpha \quad (5)$$

The internal structure of the combining means 5 is the same as in the image processing apparatus in the first embodiment, shown in FIG. 4.

The functions of the image processing apparatus of this embodiment will now be described. It will be assumed that the first color data Ri, Gi, Bi shown in FIG. 13 are input to the image processing apparatus according to this embodiment shown in FIG. 15. At this time, frequency characteristic conversion means 4$a$ removes noise from hue region data h1$r$; frequency characteristic conversion means 4$b$ to 4$f$ do not perform noise removal and output the input hue region data fh1$g$, fh1$b$, fh1$y$, fh1$m$, fh1$c$ unchanged. In this case, if the data selection means 11 did not select converted hue region data according to identifying code S1, second color data Ro would represent the second color data shown in FIG. 14 with the weighting coefficient kr equal to one (kr=1). In this case, color leakage would occur when the converted hue region data fh1$r$ that should be zero become non-zero in the originally gray part preceding pixel position 42, due to noise removal processing.

Figure 19:
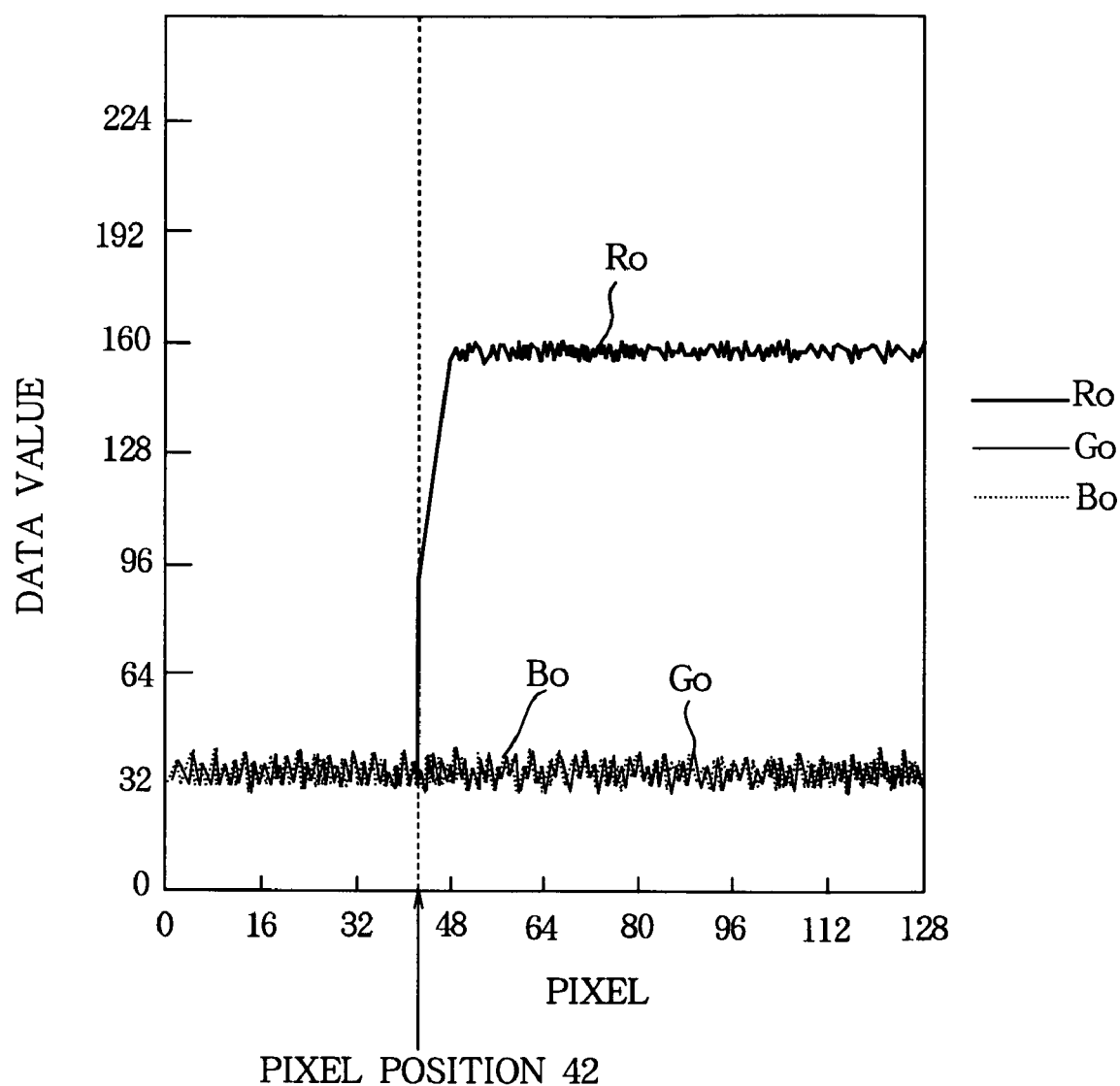
FIG. 19 shows exemplary second color data.

FIG. 19 shows the second color data Ro when the data selection means 11 selects converted hue region data according to identifying code S1. In this case, in the part following pixel position 42 identifying code S1 is six (S1=6), representing a red hue, and in the part preceding pixel position 42 identifying code S1 is twelve (S1=12). Since the converted hue region data in the part preceding pixel position 42 are all output with a value of zero (sfh1$y$=sfh1$r$=sfh1$g$=sfh1$b$=sfh1$c$=sfh1$m$=0), color leakage in the part preceding pixel position 42 is nullified.

As described above, the image processing apparatus of this embodiment removes converted hue region data that are not zero in a region where they should be zero according to the value of the identifying code S1 indicating the type of hue represented by the first color data Ri, Gi, Bi, and thereby avoids color leakage into other types of hues.

Fifth Embodiment

Figure 20:
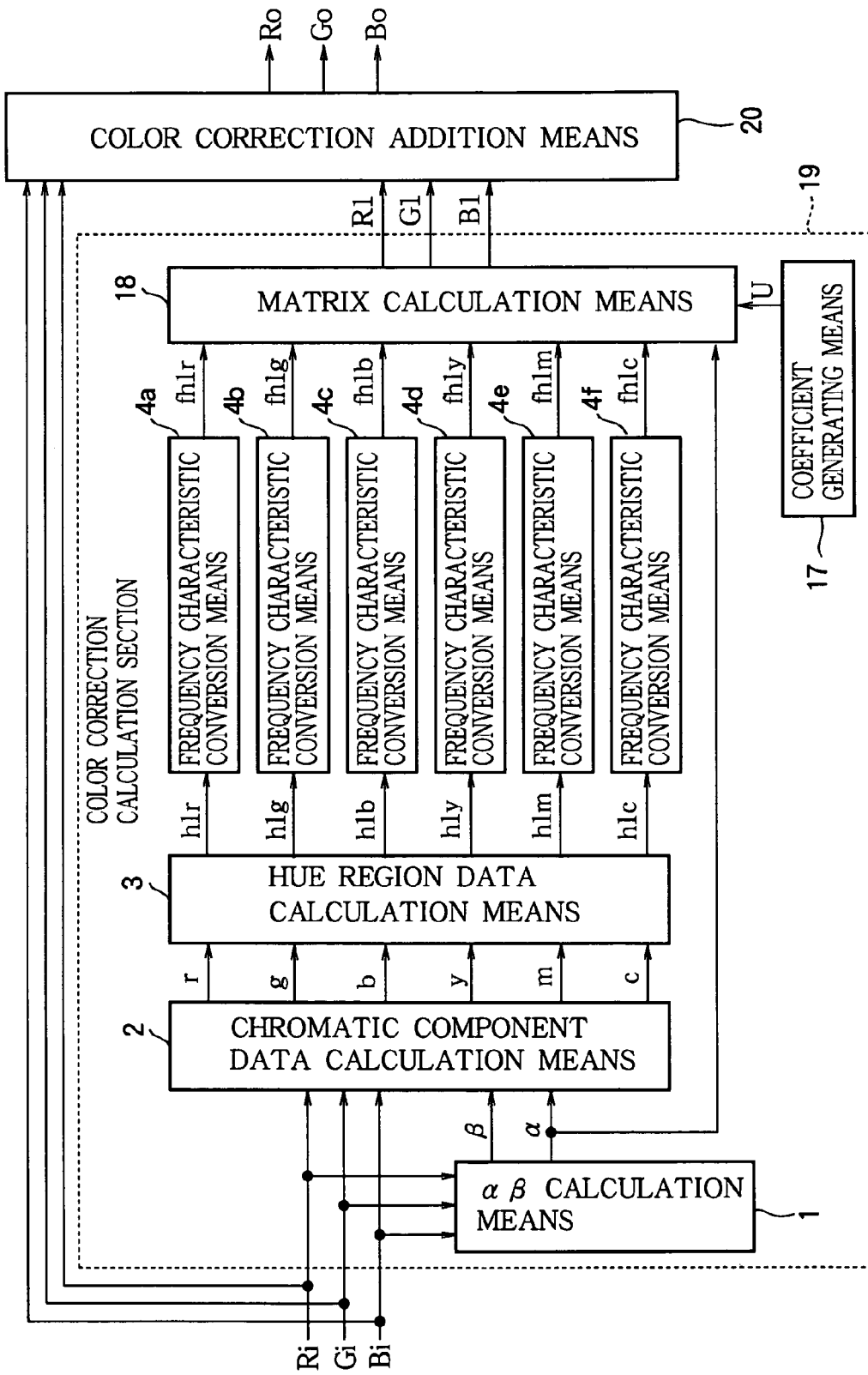
FIG. 20 is a block diagram illustrating the structure of an image processing apparatus according to a fifth embodiment.

FIG. 20 is a block diagram showing another embodiment of the invented image processing apparatus. As shown in FIG. 20, the image processing apparatus according to this embodiment comprises a color correction calculation section 19 and a color correction addition means 20. The color correction calculation section 19 and color correction addition means 20 receive the first color data Ri, Gi, Bi representing a color image.

The color correction calculation section 19 comprises the αβ calculation means 1, the chromatic component data calculation means 2, the hue region data calculation means 3, the frequency characteristic conversion means 4$a$ to 4$f$, a coefficient generating means 17, and a matrix calculation means 18.

The αβ calculation means 1, the chromatic component data calculation means 2, the hue region data calculation means 3, and the frequency characteristic conversion means 4$a$ to 4$f$ are the same as in the first embodiment.

The converted hue region data fh1$r$, fh1$g$, fh1$b$, fh1$c$, fh1$m$, fh1$y$ output from the frequency characteristic conversion means 4$a$ to 4$f$ are input to the matrix calculation means 18 together with the minimum value α. The calculation means 18 performs a matrix calculation on the converted hue region data and the minimum value α, using matrix coefficients U(Fij) output by the coefficient generating means 17, to calculate color corrections R1, G1, B1.

Figure 21:
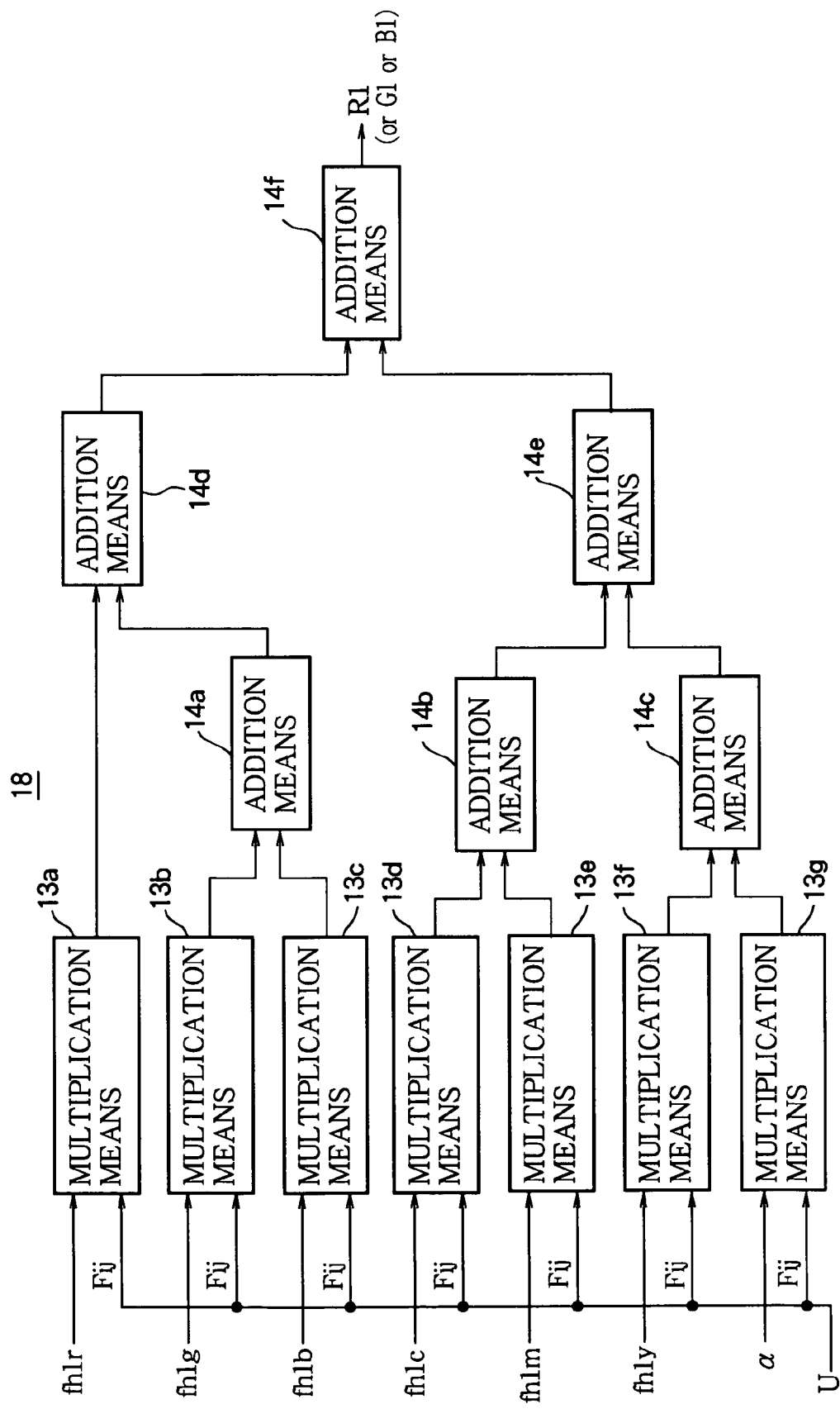
FIG. 21 is a block diagram illustrating the structure of the matrix calculation means therein.

FIG. 21 is a block diagram showing the internal structure of the matrix calculation means 18. As shown in FIG. 21, the matrix calculation means 18 comprises multiplication means 13$a$ to 13$g$ and addition means 14$a$ to 14$f$. The multiplication means 13$a$ to 13$g$ multiply converted hue region data fh1$r$, fh1$g$, fh1$b$, fh1$c$, fh1$m$, fh1$y$ and the minimum value α of the first color data by the coefficients U(Fij); addition means 14$a$ adds the outputs of multiplication means 13$b$ and 13$c$; addition means 14$b$ adds the outputs of multiplication means 13$d$ and 13$e$; addition means 14$c$ adds the outputs of multiplication means 13$f$ and 13$g$. Addition means 14$d$ adds the outputs of multiplication means 13$a$ and addition means 14$a$; addition means 14$e$ adds the outputs of addition means 14$b$ and 14c. Addition means 14f adds the outputs of addition means 14d and 14e and outputs the result as color correction R1 (or G1 or B1).

In FIG. 21, three sets of coefficients U(Fij) are given sequentially to calculate color corrections R1, G1, B1, but the matrix calculation means 18 may be configured with three similar circuits for concurrent processing.

The above operation in the matrix calculation means 18 is represented by the following equation.

$$\begin{bmatrix} R1 \\ G1 \\ B1 \end{bmatrix} = (Fij) \begin{bmatrix} fh1r \\ fh1g \\ fh1b \\ fh1c \\ fh1m \\ fh1y \\ \alpha \end{bmatrix} \quad (6)$$

The matrix coefficients in the above equation are Fij (i=1 to 3, j=1 to 7).

The color corrections R1, G1, B1 output from the matrix calculation means 18 are sent to the color correction addition means 20. The color correction addition means 20 adds the color corrections R1, G1, B1 to the first color data Ri, Gi, Bi to calculate the second color data Ro, Go, Bo.

The invented image processing apparatus performs a matrix calculation on the converted hue region data fh1r, fh1g, fh1b, fh1y, fh1m, fh1c, obtained by removing noise from the hue region data, to calculate color corrections. Like the hue region data, the converted hue region data are valid for the red, green, blue, yellow, magenta, and cyan hue components. Accordingly, a hue of interest can be adjusted without adjusting the other hues by adjusting the coefficients associated with the converted hue region data valid for the hue of interest in the coefficient generating means 17. The frequency characteristic conversion means 4a to 4f individually remove noise from their corresponding hue region data, so the characteristics and the degree of the effect of noise removal in the frequency characteristic conversion means 4a to 4f can be changed to adjust the characteristics and the quantity of noise components to be removed for each hue component.

The functions of the invented image processing apparatus will now be described. The first color data Ri, Gi, Bi are affected by various noise components in the course of transmission. If it is assumed that the color data of the image as originally created are Rs, Gs, Bs and the magnitudes of the noise components in the color data are Rn, Gn, Bn, the first color data can be represented as Ri=Rs+Rn, Gi=Gs+Gn, Bi=Bs+Bn. That is, the first color data Ri, Gi, Bi input to the image processing apparatus are represented by the sums of the original color data components Rs, Gs, Bs and noise components Rn, Gn, Bn.

Figure 22:
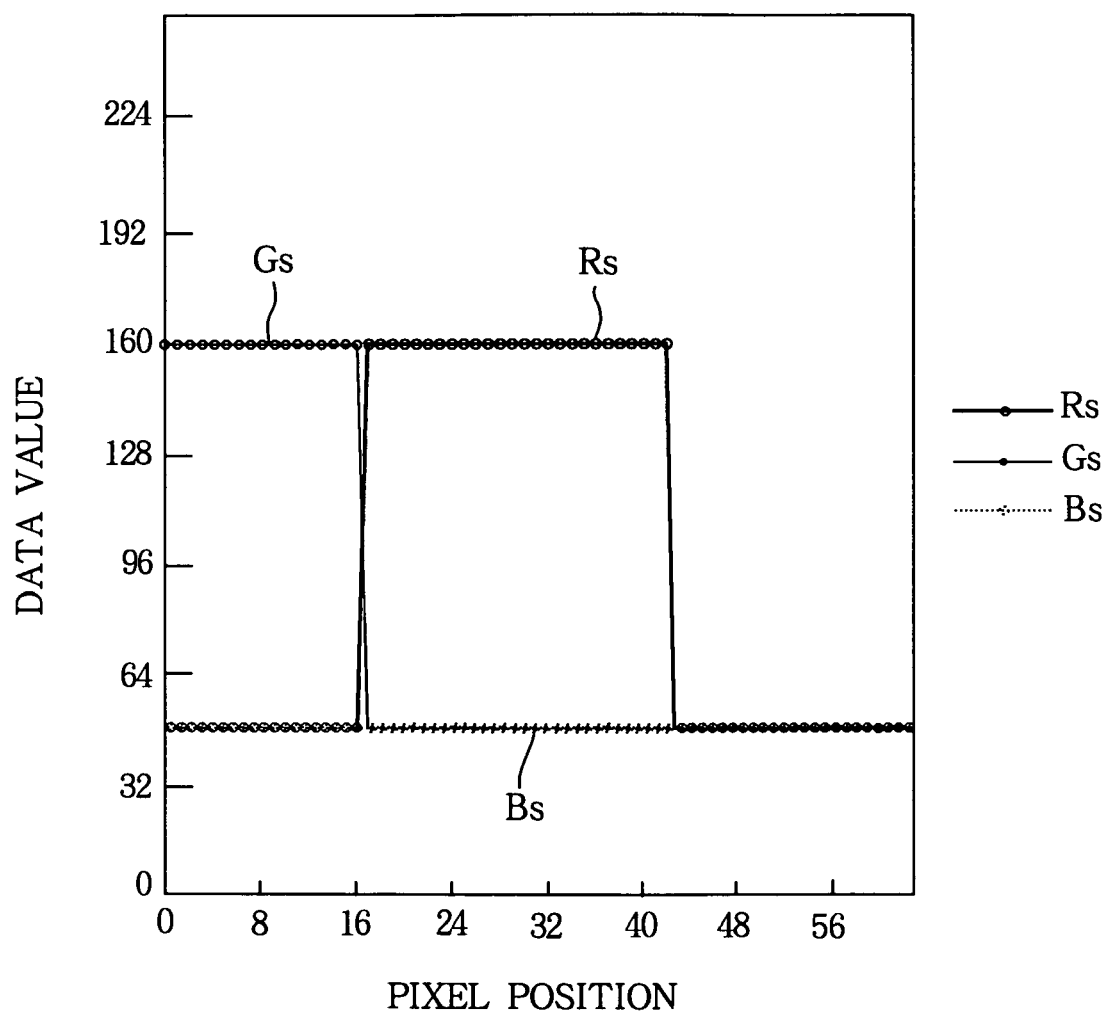
FIG. 22 shows exemplary first original color data.

FIG. 22 represents exemplary original color data Rs, Gs, Bs. In FIG. 22, the horizontal axis represents pixel positions; the vertical axis represents the values of the color data Rs, Gs, Bs at each pixel position. At pixel positions 0 to 16, Rs=48, Gs=160, and Bs=48, representing uniform green (including a gray component). At pixel positions 17 to 42, Rs=160, Gs=48, and Bs=48, representing uniform red (including a gray component). At pixel positions 43 to 63, Rs=48, Gs=48, and Bs=48, representing uniform gray.

Figure 23:
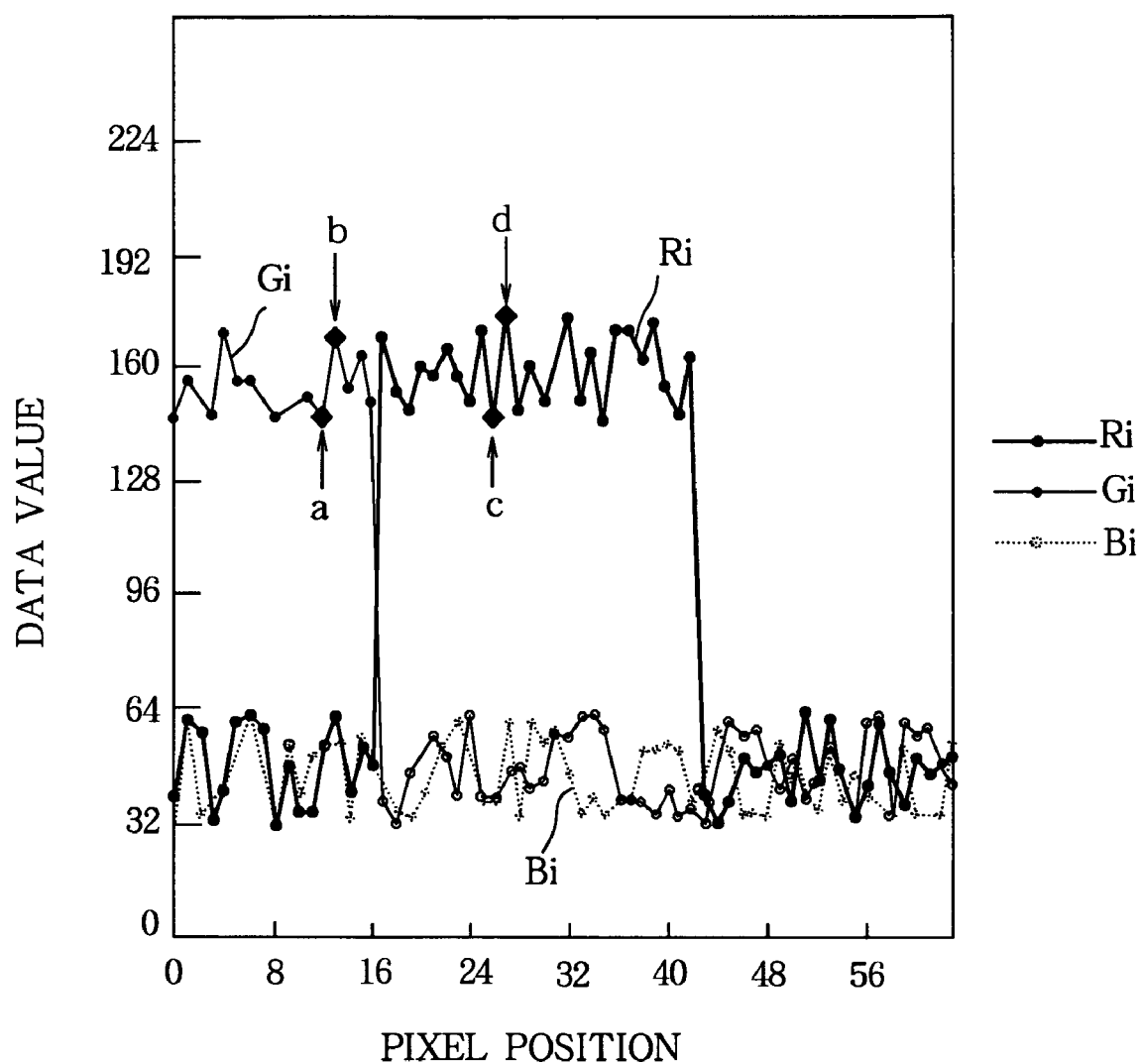
FIG. 23 shows exemplary first color data.

FIG. 23 shows the first color data Ri, Gi, Bi including noise components, that is, the color data when noise components Rn, Gn, Bn are added to the original color data Rs, Gs, Bs. In FIG. 23, arrows a and b indicate the values of color data Gi at pixel positions 12 and 13; arrows c and d indicate the values of color data Ri at pixel positions 26 and 27. The Gi color data have values of 146 at pixel position 12 (Ri=54, Bi=54) and 168 at pixel position 13 (Ri=62, Bi=54). The Ri color data have values of 146 at pixel position 26 (Gi=40, Bi=38) and 174 at pixel position 27 (Gi=46, Bi=60). The values of color data Gi at pixel positions 12 and 13 and the values of color data Ri at pixel positions 26 and 27 should be the same, but they differ because of the effect of the noise components.

The saturation of each of the first color data Ri, Gi, Bi can be represented by dividing the difference between the maximum and minimum values by the maximum value, and the brightness can be represented by the maximum value. According to this definition, the saturation of the first color data at pixel position 12 is 0.63 and the brightness is 146; the saturation of the first color data at pixel position 13 is 0.68 and the brightness is 168; the saturation of the first color data at pixel position 26 is 0.74 and the brightness is 146; the saturation of the first color data at pixel position 27 is 0.74 and the brightness is 174.

Figure 24:
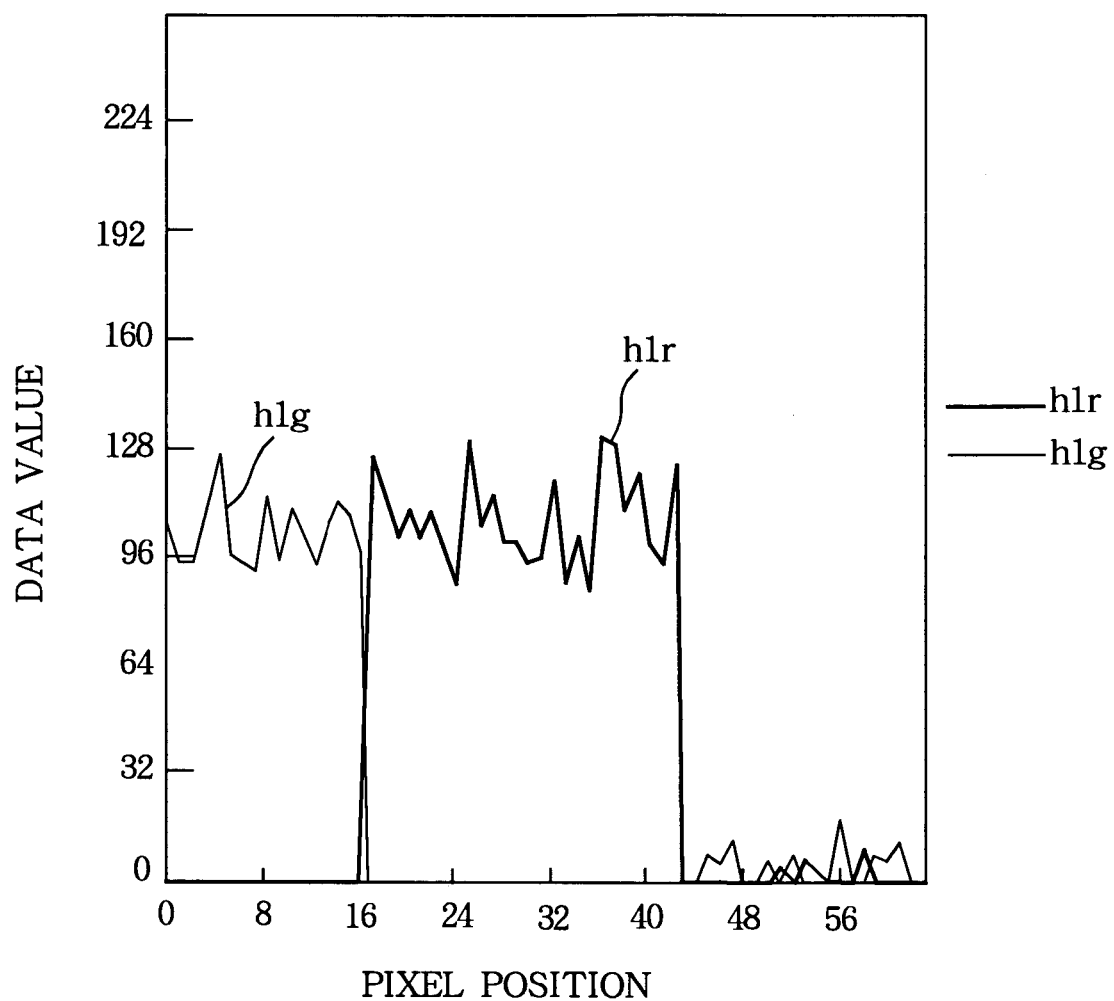
FIG. 24 shows exemplary hue region data.

FIG. 24 shows the hue region data calculated from the first color data Ri, Gi, Bi shown in FIG. 23. As shown in FIG. 24, hue region data h1r and h1g are calculated for the first color data shown in FIG. 23.

Figure 25:
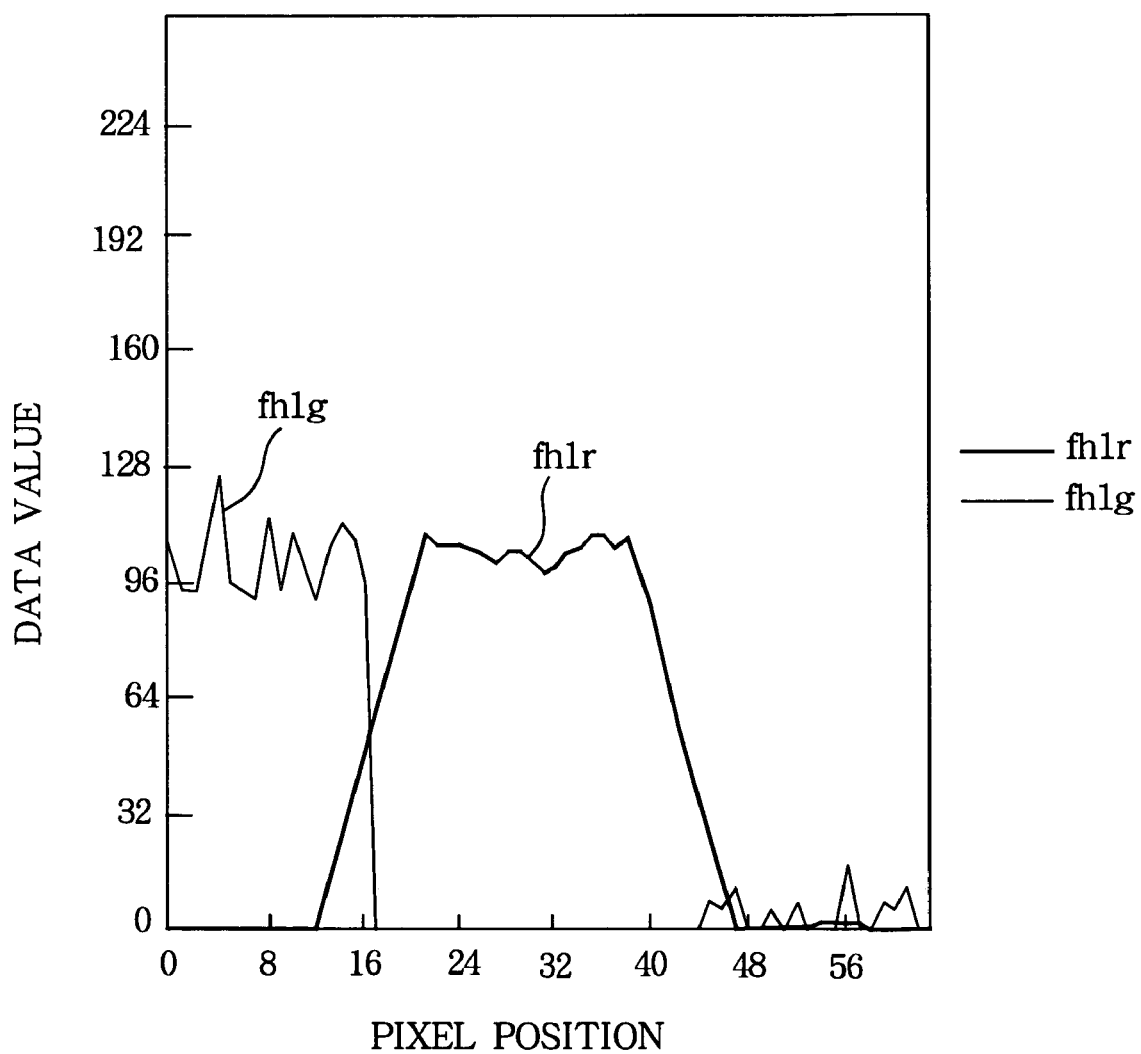
FIG. 25 shows exemplary converted hue region data.

FIG. 25 shows the converted hue region data corresponding to the hue region data h1r, h1g shown in FIG. 24, assuming that only the frequency characteristic conversion means 4a which receives hue region data h1r performs noise removal processing and the remaining frequency characteristic conversion means 4b to 4f output the input hue region data h1g, h1b, h1y, h1m, h1c as the converted hue region data fh1g, fh1b, fh1y, fh1m, fh1c. Through this processing, only the red hue component of the first color data reflects the noise removal effect, so as shown in FIG. 25, noise components included in hue region data h1r are removed from the converted hue region data fh1r. Noise components included in hue region data h1g are not removed from converted hue region data fh1g.

The converted hue region data are sent to the matrix calculation means 18. The matrix calculation means 18 performs the matrix calculation represented in equation (6) on the converted hue region data to calculate color corrections R1, G1, B1. An example of the coefficients used in this matrix calculation is shown below.

$$(Eij) = \begin{bmatrix} 0.3 & 0 & 0 & 0 & 0 & 0.3 \\ 0 & 0.3 & 0 & 0 & 0 & 0.3 \\ 0 & 0 & 0/3 & 0 & 0 & 0 \end{bmatrix} \quad (7)$$

The coefficients shown in equation (7) above increase the brightness and saturation of the red, yellow, and green hue components of the first color data.

Figure 26:
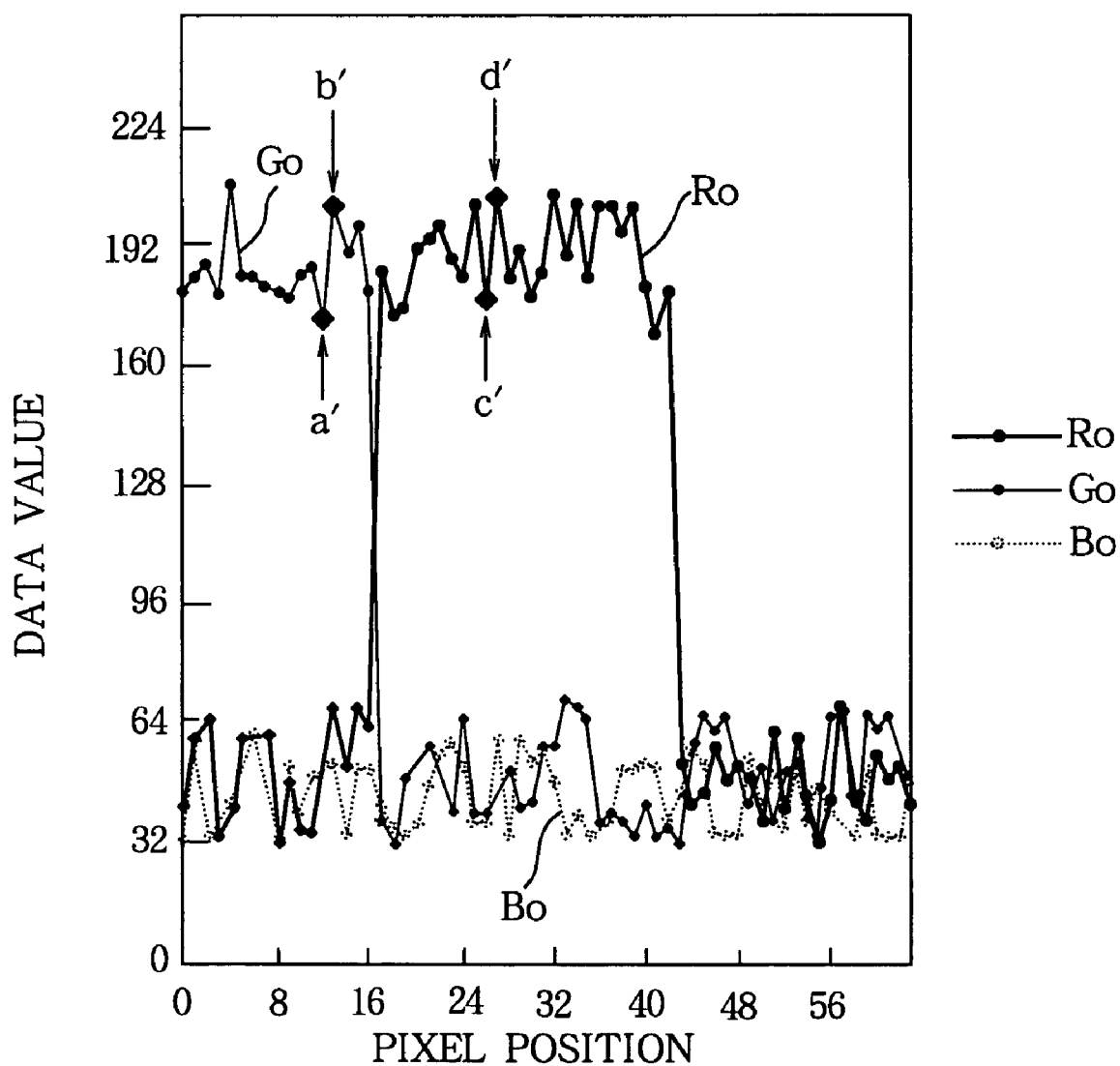
FIG. 26 shows exemplary second color data.

FIG. 26 shows the second color data Ro, Go, Bo calculated by adding the color corrections R1, G1, B1 calculated with the matrix coefficients shown in equation (7) to the first color data Ri, Gi, Bi. In FIG. 26, arrows a', b' indicate the values of color data Go at pixel positions 12, 13; arrows c', d' indicate the values of color data Ro at pixel positions 26, 27. The Go color data have values of 173 (Ro=54, Bo=54) at pixel position 12, and 202 (Ro=68, Bo=54) at pixel position 13. The Ro color data have values of 177 (Go=40, Bo=38) at pixel position 26, and 204 (Go=46, Bo=60) at pixel position 27.

Accordingly, the saturation and brightness of the second color data are 0.69 and 173 at pixel position 12, 0.73 and 202 at pixel position 13, 0.79 and 177 at pixel position 26, and 0.77 and 204 at pixel position 27. As just described, it can be seen that the brightness and saturation of the second color data Ro, Go, Bo are higher than those of the first color data Ri, Gi, Bi.

The difference between the values of first color data Gi at pixel positions 12 and 13 is 22 (168−146=22) and the difference between the values of second color data Go at the same pixel positions is 29 (202−173=29), indicating an increase. On the other hand, the difference between the values of first color data Ri at pixel positions 26 and 27 is 28 (174−146=28) and the difference between the values of second color data Ro at the same pixel positions is 27 (204−173=29); they are almost unchanged. The differences in the first color data Gi and Ri are caused by the effect of noise components; it can be seen that although the effect of noise components on second color data Go is emphasized, processing is carried out so as to increase the saturation and brightness of the second color data Ro without emphasizing the effect of its noise components.

This is because the characteristics of the frequency characteristic conversion means 4a to 4f are set so that noise is removed only from the red hue component of the first color data. If the minimum value selection means 6 of the frequency characteristic conversion means 4b, to which the hue region data h1g valid for the green hue component are input, is set to calculate the simple average value, then processing to increase the saturation and brightness of the second color data Go is also performed without emphasizing the effect of noise components.

As described above, the invented image processing apparatus comprises the frequency characteristic conversion means 4a to 4f that independently convert the hue region data h1r, h1g, h1b, h1y, h1c, h1m respectively valid for the red, green, blue, yellow, cyan, and magenta hue components, and performs color conversion processing to increase the brightness and saturation by a matrix calculation on the converted hue region data fh1r, fh1g, fh1b, fh1y, fh1c, fh1m obtained through noise removal processing, making it possible to increase the brightness and saturation of the first color data without emphasizing noise components.

In addition, color corrections R1, G1, B1 for adjusting the brightness and/or saturation of the first color data are calculated by using converted hue region data fh1r to fh1c and the calculated color corrections are added to the first color data Ri, Gi, Bi to increase the brightness and/or saturation, which prevents the image blurring generally associated with noise removal processing. That is, because the effect of noise removal appears only in color corrections R1, G1, B1 and the edge information in the first color data is maintained, the brightness and/or saturation can be raised without emphasizing noise components. As shown in FIG. 26, changes in the values of the second color data between pixel positions 16 to 17 and 42 to 43 do not become gradual, showing that the edge information of the image is maintained.

Furthermore, the invented image processing apparatus removes noise components from the hue region data h1r, h1g, h1b, h1y, h1m, h1c respectively valid for the red, green, blue, yellow, magenta, and cyan hue components by means of separate frequency characteristic conversion means 4a, 4b, 4c, 4d, 4e, 4f, the filter characteristics of which can be varied to remove noise from the different hue components independently. In the description of this embodiment, the characteristics of the frequency characteristic conversion means 4a to 4f are set so that the effect of noise removal appears only in the red hue component of the first color data, but they may be configured so that the effect of noise removal appears in all hue components. The quantity of the noise components removed can also be changed for each hue component.

In the description of this embodiment, the matrix calculation means 18 performs an operation using matrix coefficients (Fij) that increase the brightness and saturation of the three hue components red, yellow, and green, but other color correction operations may be performed to increase the brightness and/or saturation of other hue components.

The size of the brightness and/or saturation adjustment and the hue components to be adjusted can be set by the matrix coefficients Fij in equation (6).

Although the description of this embodiment assumes that the frequency characteristic conversion means 4a to 4f are used to remove noise components, they may instead be configured to convert frequency characteristics in a way that suppresses or emphasizes arbitrary frequency components.

Sixth Embodiment

Figure 27:
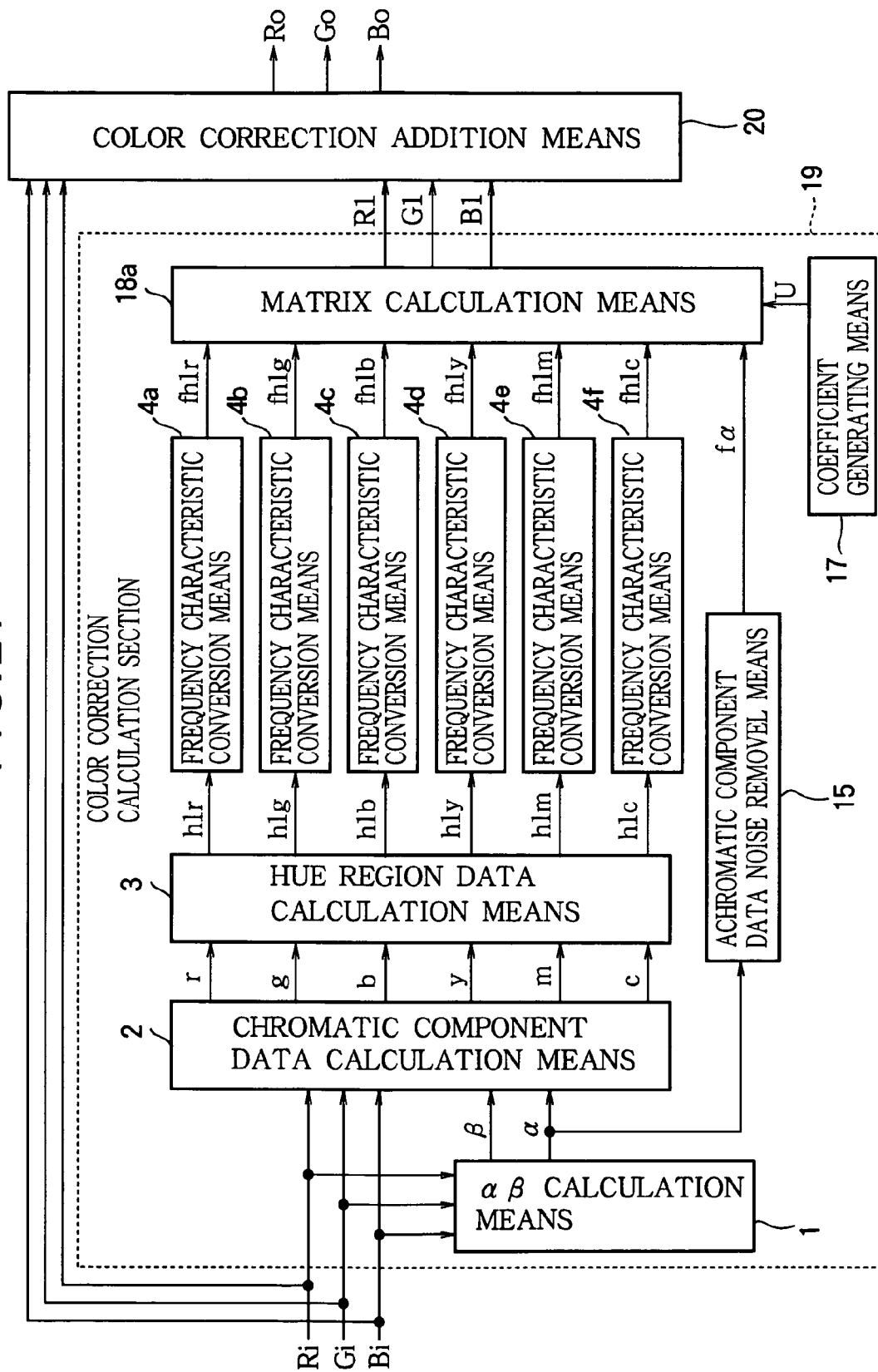
FIG. 27 is a block diagram illustrating the structure of an image processing apparatus according to a sixth embodiment.

FIG. 27 is a block diagram showing another embodiment of the invented image processing apparatus. This embodiment differs from the image processing apparatus shown in FIG. 20 by having an achromatic component data noise removal means 15. The achromatic component data noise removal means 15 removes noise from the minimum value α that represents the achromatic component of the first color data Ri, Gi, Bi, and outputs a noise-free achromatic component fα. The matrix calculation means 18a performs a matrix calculation on the converted hue region data fh1r, fh1g, fh1b, fh1c, fh1m, fh1y and the noise-free achromatic component fα. The matrix calculation means 18a may have the same structure as in FIG. 21. In this case, multiplication means 13g in FIG. 21 receives the noise-free achromatic component fα instead of the achromatic component α.

Since the image processing apparatus according to this embodiment includes the achromatic component data noise removal means 15, it can remove noise from the achromatic component of the first color data Ri, Gi, Bi. The magnitude of the achromatic component affects the saturation of a color in association with the magnitude of the chromatic components. The achromatic components also include brightness information, and have different human perceptual characteristics from those of chromatic components. Accordingly, the provision of the achromatic component data noise removal means 15 enables noise removal processing to be tailored to human perceptual characteristics.

Seventh Embodiment

Figure 28:
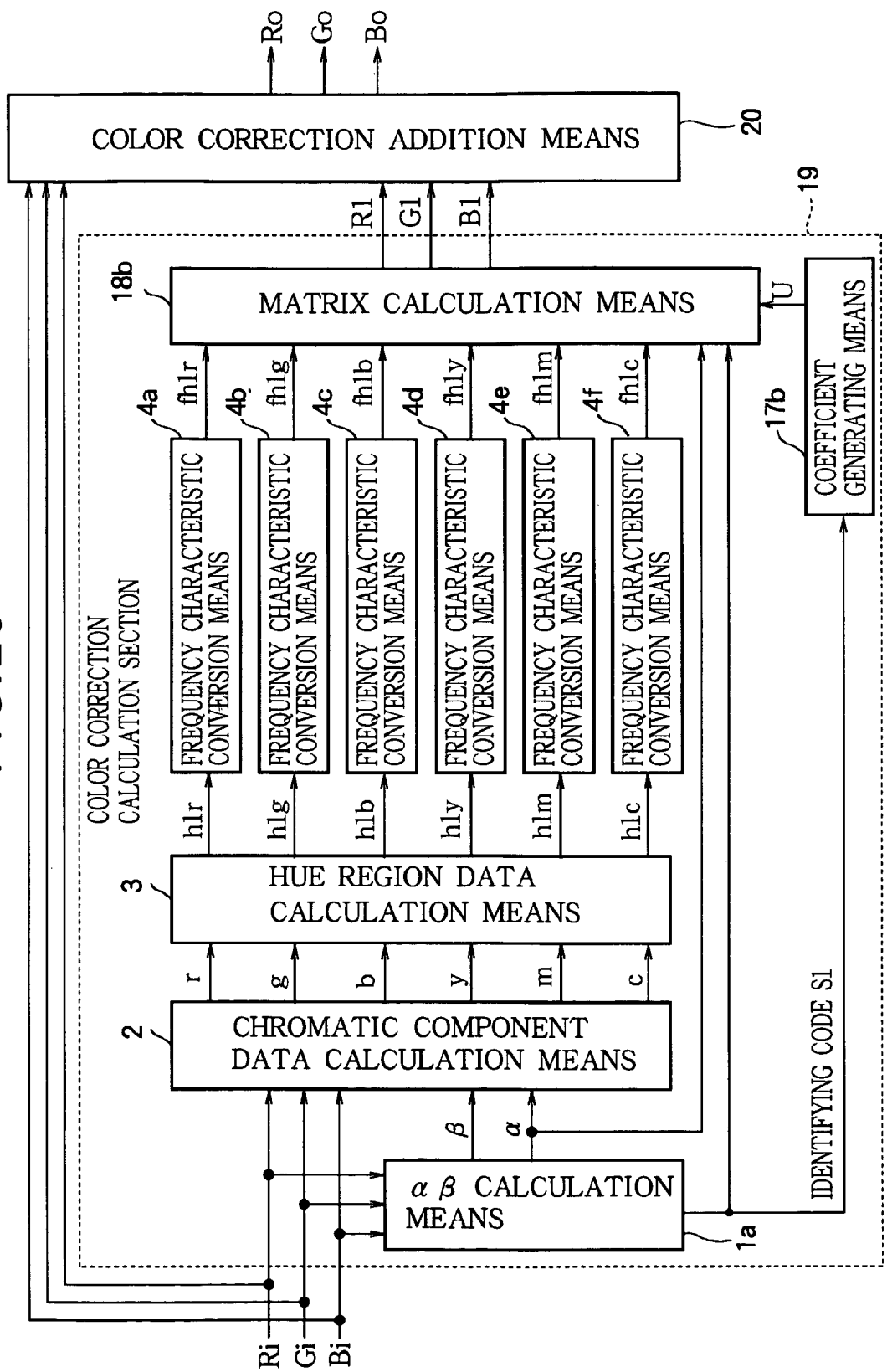
FIG. 28 is a block diagram illustrating the structure of an image processing apparatus according to a seventh embodiment.

FIG. 28 is a block diagram showing another embodiment of the invented image processing apparatus. As shown in FIG. 28, the αβ calculation means 1a of the image processing apparatus according to this embodiment selects and outputs the maximum value β and the minimum value α of the first color data Ri, G, Bi, and outputs, as described in the fourth embodiment, an identifying code S1 giving hue information about colors represented by the first color data Ri, Gi, Bi. The identifying code S1 is input to a coefficient generating means 17b and a matrix calculation means 18b.

The relationship between the value of identifying code S1 and the magnitudes of color data Ri, Gi, Bi is the same as in FIG. 16; as shown in FIG. 17, one is output as identifying code S1 (S1=1) for first color data Ri, Gi, Bi representing hues between red and yellow. Similarly, three is output (S1=3) for hues between yellow and green, two (S1=2) for hues between green and cyan, four (S1=4) for hues between cyan and blue, five (S1=5) for hues between blue and magenta, and zero (S1=0) for hues between magenta and red. Six (S1=6) is output as identifying code S1 for a combination of the first color data Ri, Gi, Bi representing red. Similarly, eleven (S1=11) is output for yellow, seven (S1=7) for green, nine (S1=9) for cyan, eight (S1=8) for blue, and ten (S1=10) for magenta.

When the values of Ri, Gi, and Bi are identical, the first color data represent an achromatic gray; in this case, twelve is output as identifying code S1 (S1=12).

The chromatic component data calculation means 2, the hue region data calculation means 3, and the frequency characteristic conversion means 4a to 4f operate as described in the first embodiment. That is, the chromatic component data calculation means 2 calculates chromatic component data r, g, b, y, m, c. The hue region data calculation means 3 uses the chromatic component data r, g, b, y, m, c and equation (1) to calculate hue region data h1r, h1g, h1b, h1c, h1m, h1y. The frequency characteristic conversion means 4a to 4f remove noise from hue region data h1r, h1g, h1b, h1c, h1m, h1y and output converted hue region data fh1r, fh1g, fh1b, fh1c, fh1m, fh1y. The converted hue region data fh1r, fh1g, fh1b, fh1c, fh1m, fh1y obtained by removing noise from hue region data h1r, h1g, h1b, h1c, h1m, and h1y are valid for the red, green, blue, yellow, cyan, and magenta hue components, respectively.

Figure 29:
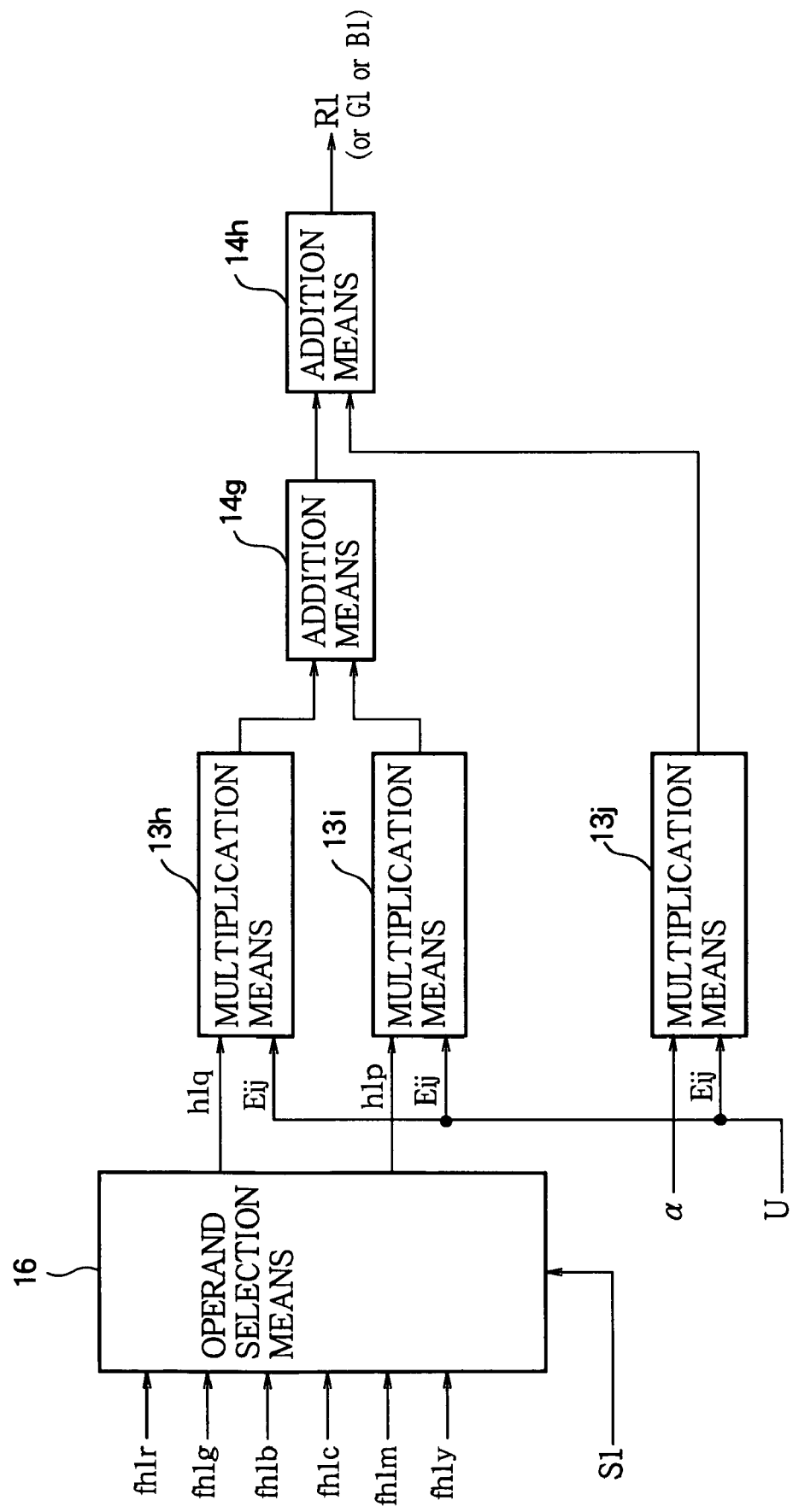
FIG. 29 is a block diagram showing the structure of the matrix calculating means therein.

The converted hue region data fh1r, fh1g, fh1b, fh1c, fh1m, fh1y are input to the matrix calculation means 18b. FIG. 29 is a block diagram showing an exemplary internal structure of the matrix calculation means 18b. As shown in FIG. 29, the matrix calculation means 18b comprises an operand selection means 16 as a first stage. The operand selection means 16 receives the converted hue region data fh1r, fh1g, fh1b, fh1c, fh1m, fh1y and identifying code S1. The operand selection means 16 selects data valid for the hue represented by the combination of the first color data Ri, Gi, Bi from among the converted hue region data fh1r, fh1g, fh1b, fh1c, fh1m, fh1y according to the identifying code S1 and outputs the selected data as operands h1p, h1q for a matrix calculation. When there is only one item of valid converted hue region data, the operand selection means 16 outputs zero for one of the operands h1p, h1q; when there are no valid converted hue region data, zero is output for both operands h1p, h1q.

FIG. 30 shows the relationship between the identifying code S1 and the terms selected as h1p and h1q. When the identifying code S1 is one (S1=1), the combination of the first color data Ri, Gi, Bi represents a hue between red and yellow, so only the hue region data h1r valid for red and the hue region data h1y valid for yellow are non-zero; the other hue region data are zero. Accordingly, the operand selection means 16 selects fh1r and fh1y as operands h1p, h1q. When S1=11, the combination of the first color data Ri, Gi, Bi represents the yellow hue component, so only the hue region data h1y valid for yellow are non-zero; the other hue region data are zero. Accordingly, the operand selection means 16 selects fh1y as h1q and outputs zero as h1p (h1p=0).

As shown in FIG. 29, the operands h1p, h1q selected by the operand selection means 16 and the minimum value α are input to the multiplication means 13h, 13i, and 13j, and multiplied by matrix coefficients U(Eij). The outputs of the multiplication means 13h, 13i are added by the addition means 14g. The output of the multiplication means 13j and the output of the addition means 14g are added by the addition means 14h to calculate a color correction R1 (or G1 or B1). Matrix coefficients U(Eij) are output by the coefficient generating means 17b according to the value of the identifying code S1. The coefficient generating means 17b sets the coefficients corresponding to the converted hue region data selected as operands h1p, h1q by the operand selection means 16 as matrix coefficients Eij. When the operand selection means 16 selects fh1r as term h1p and fh1y as term h1q, the coefficient generating means 17b selects and outputs the coefficients for fh1r as the coefficients associated with term h1p, and the coefficients for fh1y as the coefficients associated with term h1q. The coefficient generating means 17b outputs coefficients that are multipliers for terms fh1r, fh1y for each of the color corrections R1, G1, B1.

The above operation in the matrix calculation means 18b is represented by the following matrix equation.

$$\begin{bmatrix} R1 \\ G1 \\ B1 \end{bmatrix} = (Eij) \begin{bmatrix} h1p \\ h11 \\ \alpha \end{bmatrix} \qquad (8)$$

The coefficients (Eij) in equation (8) form a three-by-three matrix (i=1 to 3, j=1 to 3).

The calculated color corrections R1, G1, B1 are input to the color correction addition means 20. The color correction addition means 20 calculates the second color data Ro, Go, Bo by adding the color corrections R1, G1, B1 to the first color data Ri, Gi, Bi.

The image processing apparatus according to this embodiment selects the valid converted hue region data, that is, the converted hue region data relating to the hue of each pixel in the first color data Ri, Gi, Bi, as the matrix operands h1p, h1q, so the amount of matrix operation can be reduced. In addition, the number of multipliers and adders in the matrix calculation means 18b is reduced, reducing the size of the circuit.

Figure 31:
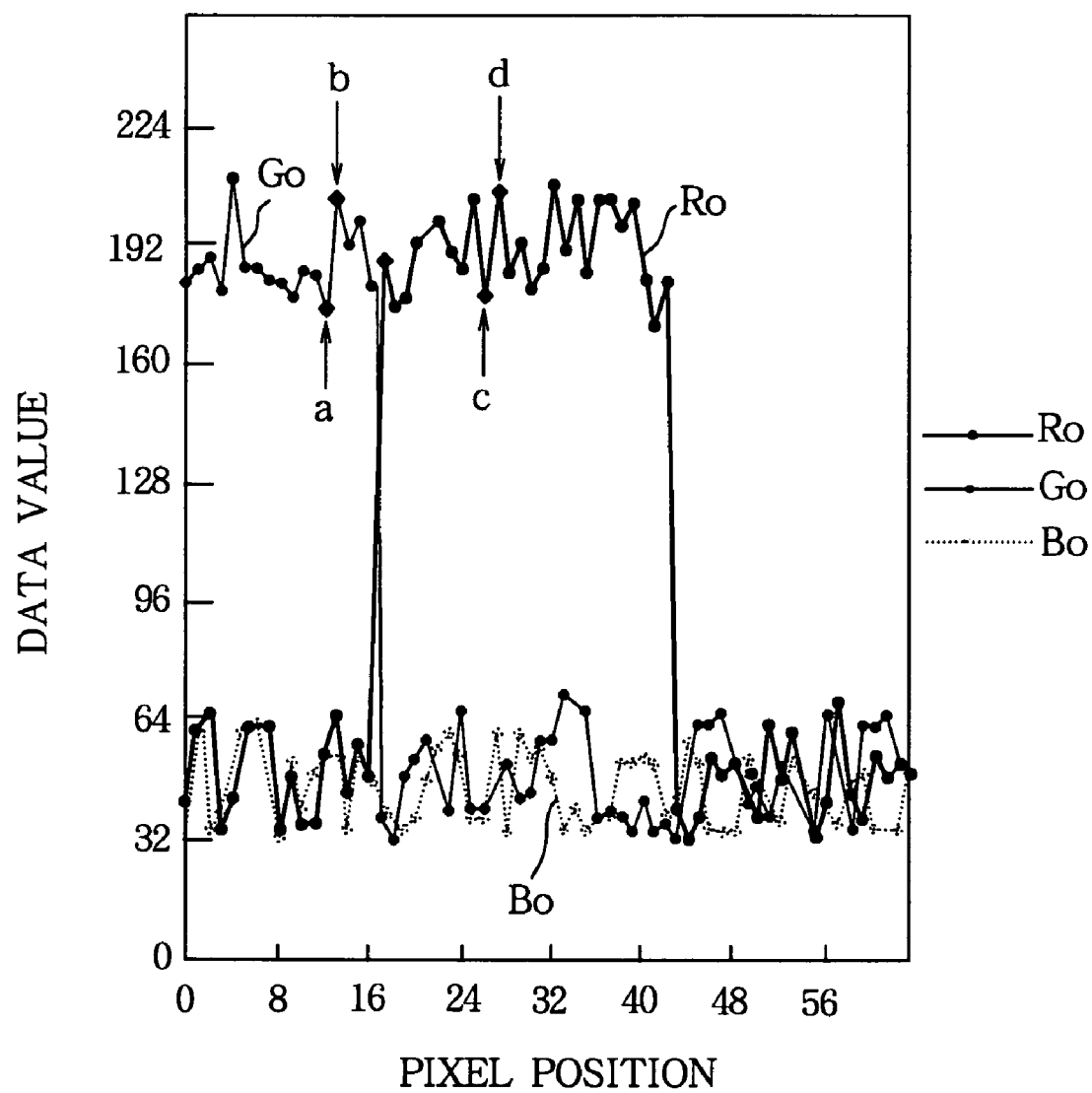
FIG. 31 shows exemplary second color data.

FIG. 31 shows the second color data Ro, Go, Bo obtained in the image processing apparatus according to this embodiment by processing the first color data Ri, Gi, Bi shown in FIG. 23. The second color data Ro, Go, Bo shown in FIG. 31 are obtained by removing noise only from the hue region data h1r valid for the red hue component in the frequency characteristic conversion means 4a and using the matrix coefficients shown in equation (7) to increase brightness and saturation of the hue in the matrix calculation means 18.

In FIG. 31, arrows a and b indicate the values of color data Go at pixel positions 12 and 13; arrows c and d indicate the values of color data Ro at pixel positions 26 and 27. The Go color data have values of 173 at pixel position 12 (Ro=54, Bo=54) and 202 at pixel position 13 (Ro=68, Bo=54). The Ro color data have values of 177 at pixel position 26 (Go=40, Bo=38) and 204 at pixel position 27 (Go=46, Bo=60).

These results are the same as the second color data Ro, Go, Bo obtained by the image processing apparatus according to the fifth embodiment shown in FIG. 20. That is, the image processing apparatus according to this embodiment can also increase the brightness and saturation of a specific hue component without further emphasizing the effect of noise components included in the color data, as in the fifth embodiment.

Next, the specific effect of the image processing apparatus according to this embodiment will be described in comparison with the image processing apparatus according to the fifth embodiment. The difference between them is in that whereas the fifth embodiment performs a matrix calculation on the six converted hue region data fh1r to fh1c as shown in equation (6), this embodiment performs a matrix calculation on operands h1p and h1q selected by the operand selection means 16 according to the identifying code S1 as indicated in the above equation (8). The image processing apparatus according to this embodiment produces the following effects when the first color data do not include noise components, that is, Ri=Rs, Gi=Gs, Bi=Bs.

Figure 32:
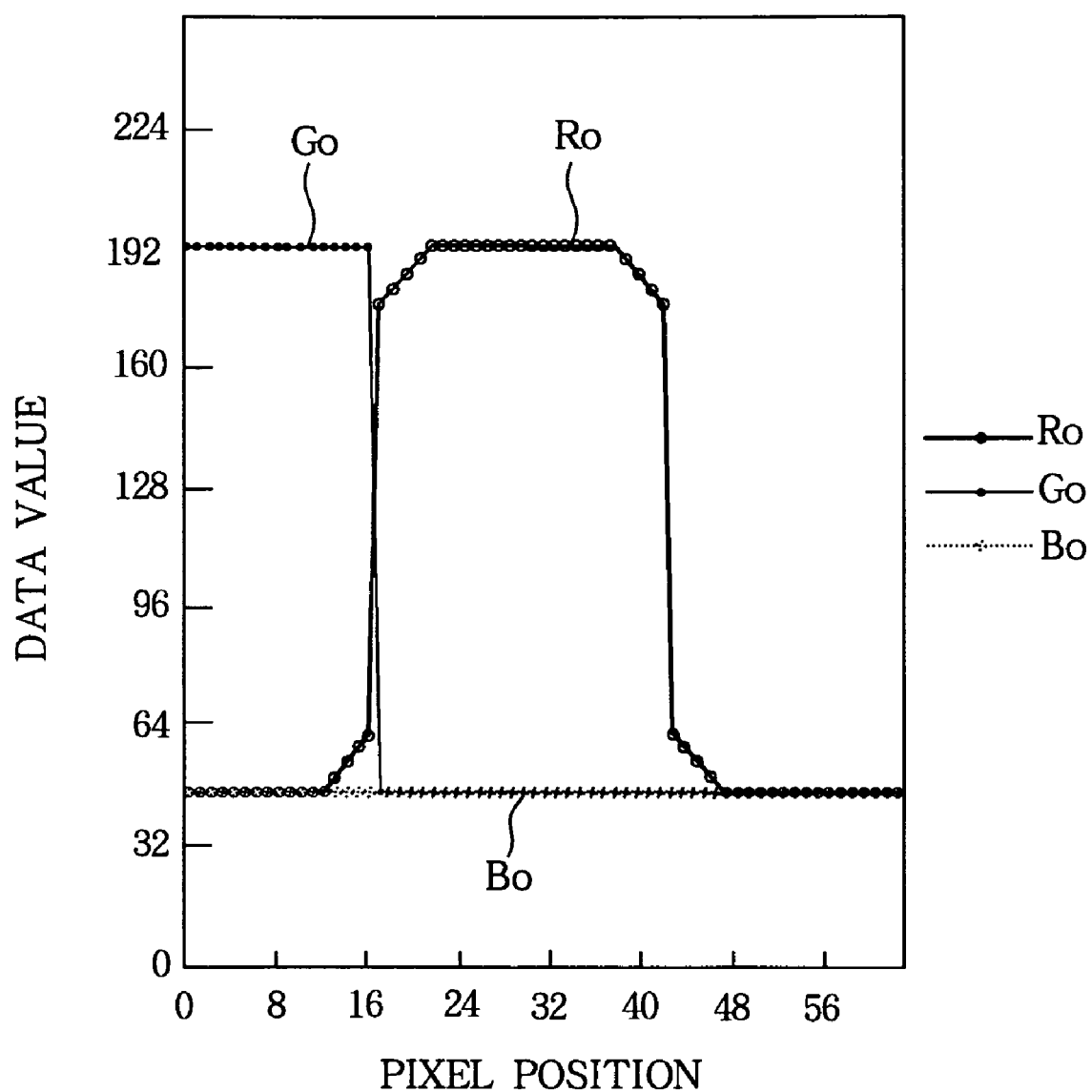
FIG. 32 shows further exemplary second color data.

FIG. 32 shows the second color data calculated when first color data identical to the original color data (Ri=Rs, Gi=Gs, Bi=Bs) are input to the image processing apparatus according to the fifth embodiment shown in FIG. 20. It will now be assumed that the frequency characteristic conversion means 4a removes noise from hue region data h1r and the other frequency characteristic conversion means 4b to 4f output the input hue region data h1g, h1b, h1y, h1m, h1c unchanged as the converted hue region data. The matrix calculation means 18 is assumed to use the matrix coefficients for raising brightness and saturation shown in equation (7).

As shown in FIG. 32, the value of the Ro second color data processed by the image processing apparatus according to the fifth embodiment increases at pixel positions 13 to 16 and 43 to 46. Pixel positions 13 to 16 are in an originally green area adjacent a red area, and the increase in the value of color data Ro produces a yellowish tinge in the originally green area; pixel positions 43 to 46 are in an originally gray region adjacent to the red region, and the increase in the value of color data Ro produces a reddish tinge in the originally gray area. These phenomena are observed as a 'bleeding' from the red area in pixel positions 16 to 43.

The 'bleeding' is caused when the frequency characteristic conversion means 4a eliminates high-frequency components from hue region data h1r and the value of converted hue region data fh1r is non-zero in the green and gray regions where there is no red hue component. That is, when the combination of the first color data Ri, Gi, Bi represents a purely green color, hue region data other than h1g are all zero. Accordingly, in equation (6), all converted hue region data fh1r, fh1b, fh1y, fh1m, fh1c other than the data fh1g valid for the green hue component must be zero. When fh1r becomes non-zero due to noise removal processing, however, the value of Ro increases in the region at pixel positions 13 to 16, causing the 'bleeding'.

Figure 33:
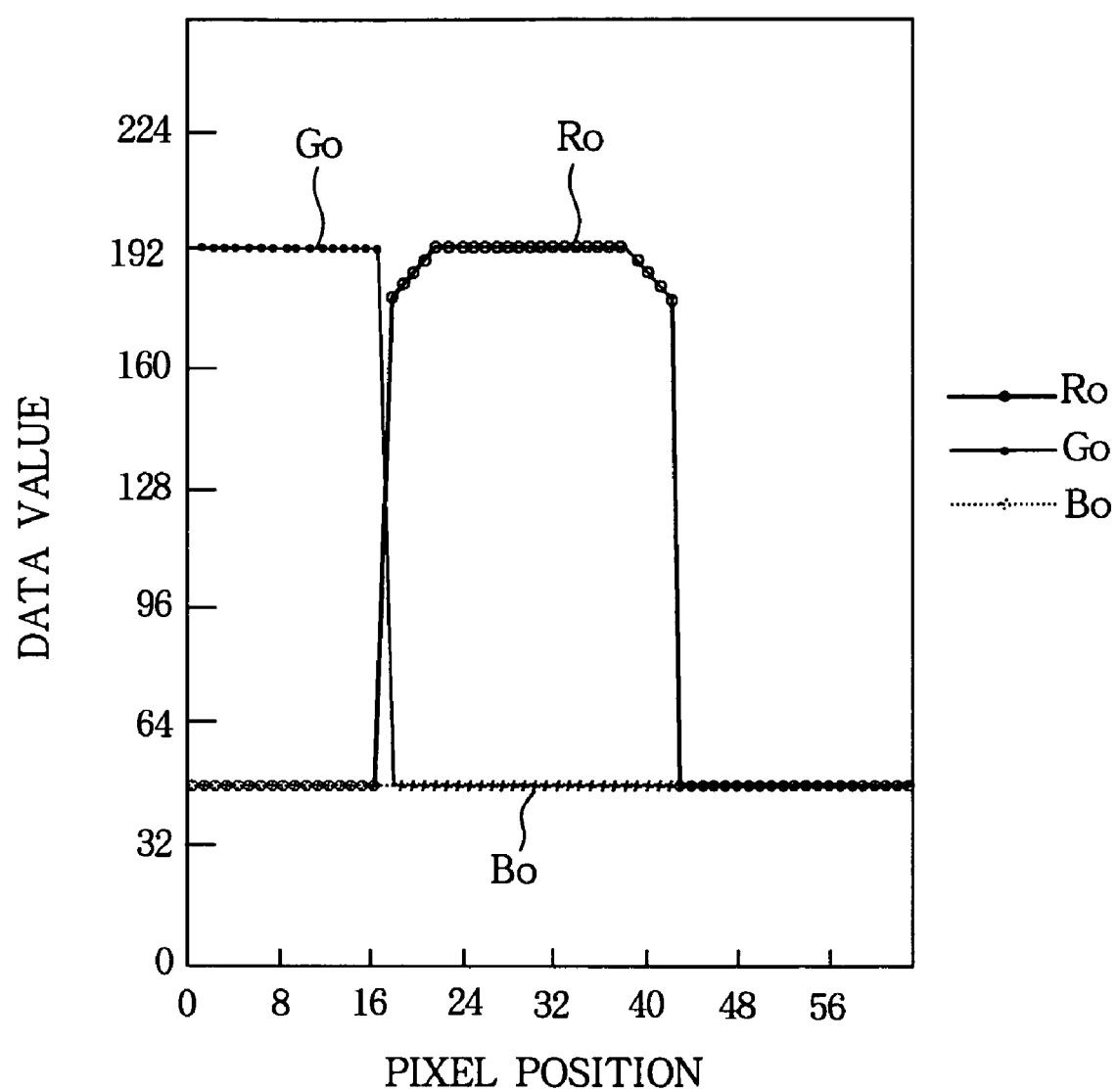
FIG. 33 shows still further exemplary second color data.

FIG. 33 shows the second color data Ro, Go, Bo obtained by processing noise-free first color data Ri, Gi, Bi under the same conditions as above (Ri=Rs, Gi=Gs, Bi=Bs) by the image processing apparatus according to this embodiment. The image processing apparatus according to this embodiment uses the operand selection means 16 to remove converted hue region data having non-zero values in an area where they should be zero according to the identifying code S1, so the bleeding indicated in FIG. 32 does not occur. That is, in the green region at pixel positions preceding pixel position 16, the identifying code S1 is seven (S1=7), so fh1g and zero are output as the operands h1p, h1q, respectively, as shown in FIG. 30. In the region at pixel positions after pixel position 43, the identifying code S1 is 12 (S1=12), so zero is output as both operands h1p, h1q. The operand selection means 16 thus selects and outputs only actually valid operands according to the identifying code S1, and accordingly the converted hue region data fh1r valid for the red hue component are removed from the green and gray areas.

As described above, the image processing apparatus according to this embodiment can reduce the amount of matrix computation and prevent the occurrence of 'bleeding' due to noise removal processing.

What is claimed is:

1. An image processing apparatus for converting the frequency characteristics of first color data representing a color image and outputting second color data corresponding to the first color data, comprising:

a hue region data calculation means for using the first color data to calculate first hue region data valid for a plurality of particular hue components in the color image represented by the first color data;

a frequency characteristic conversion means for converting the frequency characteristics of the first hue region data independently for each of the hue components and thereby outputting second hue region data; and means for calculating the second color data by using the second hue region data.

2. The image processing apparatus of claim 1, wherein the first hue region data calculated by the hue region data calculation means are valid for red, green, blue, yellow, cyan, and magenta hue components of the color image represented by the first color data.

3. The image processing apparatus of claim 2, wherein the hue region data calculation means calculates chromatic component data r, g, b, y, c, m representing sizes of the red, green, blue, yellow, cyan, and magenta hue components after an achromatic component has been removed from the colors represented by the first color data, and calculates the first hue region data h1r, h1g, h1b, h1y, h1c, h1m valid for the red, green, blue, yellow, cyan, and magenta hue components by using the chromatic component data and the following formulas:

$$h1r = \min(y, m)$$

$$h1g = \min(y, c)$$

$$h1b = \min(m, c)$$

$$h1c = \min(g, b)$$

$$h1m = \min(r, b)$$

$$h1y = \min(r, g) \quad (1).$$

4. The image processing apparatus of claim 2, wherein the frequency characteristic conversion means calculates second hue region data fh1r, fh1g, fh1b, fh1y, fh1c, fh1m obtained by independently converting the frequency characteristics of the first hue region data h1r, h1g, h1b, h1y, h1c, h1m valid for the red, green, blue, yellow, cyan, and magenta hue components, and the means for calculating the second color data calculates second color data comprising color data Ro, Go, Bo representing sizes of the red, green, and blue components by using the second color region data and achromatic data α representing the achromatic component in the color image represented by the first color data, from the following formulas:

$$Ro = fh1r + fh1m + fh1y + \alpha$$

$$Go = fh1g + fh1y + fh1c + \alpha$$

$$Bo = fh1b + fh1c + fh1m + \alpha \quad (3).$$

5. The image processing apparatus of claim 1, wherein the means for calculating the second color data calculates the second color data by taking a weighted sum of the first hue region data and the second hue region data for each hue component.

6. The image processing apparatus of claim 1, further comprising means for outputting second achromatic data by converting the frequency characteristics of first achromatic data representing the achromatic component in the image represented by the first color data, wherein the means for calculating the second color data outputs the second color data by using the second hue region data and the second achromatic data.

7. The image processing apparatus of claim 1, further comprising:
   means for outputting an identification code indicating information about hues of colors represented by the first color data; and
   selection means for selecting, according to the identification code, second hue region data concerning hues of the colors represented by the first color data; wherein
   the means for calculating the second color data outputs the second color data by using the second hue region data selected by the selection means.

8. The image processing apparatus of claim 1, further comprising:
   coefficient generating means for outputting prescribed matrix coefficients set for each component of the second hue region data; and
   matrix calculation means for calculating corrections for correcting the brightness and/or saturation of each hue component of the first color data by performing a matrix calculation including multiplication of the second hue region data by the matrix coefficients, the second hue region data being the data operated on; wherein
   the second color data are calculated from said corrections.

9. The image processing apparatus of claim 8, wherein:
   the frequency characteristic conversion means outputs second hue region data fh1r, fh1g, fh1b, fh1y, fh1c, fh1m obtained by independently converting the frequency characteristics of the first hue region data h1r, h1g, h1b, h1y, h1c, h1m valid for the red, green, blue, yellow, cyan, and magenta hue components;
   the coefficient generating means outputs matrix coefficients Fij (i=1 to 3, j=1 to 3);
   the matrix calculation means calculates corrections R1, G1, B1 for the sizes of the red, green, and blue components of the first color data from the following formula, including an achromatic data term α representing the size of the achromatic component in the color image represented by the first color data:

$$\begin{bmatrix} R1 \\ G1 \\ B1 \end{bmatrix} = (Fij) \begin{bmatrix} fh1r \\ fh1g \\ fh1b \\ fh1c \\ fh1m \\ fh1y \\ \alpha \end{bmatrix}. \quad (6)$$

10. The image processing apparatus of claim 8, further comprising means for outputting second achromatic data by converting frequency characteristics of first achromatic data representing an achromatic component in the image represented by the first color data, wherein the matrix calculation means calculates the corrections by performing a matrix calculation including the second achromatic data as the data operated on.

11. The image processing apparatus of claim 8, further comprising:
   means for outputting an identification code indicating information about hues of colors represented by the first color data; and
   selection means for selecting, according to the identification code, second hue region data concerning hues of the colors represented by the first color data; wherein the matrix calculation means calculates corrections R1, G1, B1 by the following formula, using the second hue region data selected by the selection means as the terms h1p and h1q:

$$\begin{bmatrix} R1 \\ G1 \\ B1 \end{bmatrix} = (Eij) \begin{bmatrix} h1p \\ h11 \\ \alpha \end{bmatrix}. \quad (8)$$

12. The image processing apparatus of claim 8, wherein the frequency characteristic conversion means attenuates or eliminates high-frequency components of hue region data valid for a particular hue component.

13. The image processing apparatus of claim 8, wherein the frequency characteristic conversion means enhances edge components of hue region data valid for a particular hue component.

14. An image processing method for converting the frequency characteristics of first color data representing a color image and outputting second color data corresponding to the first color data, comprising:
   using, in a hue region data calculating means, the first color data to calculate first hue region data valid for a plurality of particular hue components in the color image represented by the first color data;
   converting, in a frequency characteristic conversion means, the frequency characteristics of the first hue region data independently for each of the hue components and thereby outputting second hue region data; and
   calculating, in a second color data calculating means, the second color data by using the second hue region data.

15. The image processing method of claim 14, wherein the calculated first hue region data are valid for red, green, blue, yellow, cyan, and magenta hue components of the color image represented by the first color data.

16. The image processing method of claim 15, wherein the first hue region data h1r, h1g, h1b, h1y, h1c, h1m valid for the red, green, blue, yellow, cyan, and magenta hue components are calculated by calculating chromatic component data r, g, b, y, c, m representing sizes of the red, green, blue, yellow, cyan, and magenta hue components after an achromatic component has been removed from the colors represented by the first color data, and using the chromatic component data in the following formulas:

$h1r = \min(y, m)$ $h1g = \min(y, c)$ $h1b = \min(m, c)$ $h1c = \min(g, b)$ $h1m = \min(r, b)$ $h1y = \min(r, g)$ \quad (1).

17. The image processing method of claim 15, wherein the second color data, comprising color data Ro, Go, Bo representing sizes of the red, green, and blue components, are calculated by calculating second hue region data fh1r, fh1g, fh1b, fh1y, fh1c, fh1m obtained by independently converting the frequency characteristics of the first hue region data h1r, h1g, h1b, h1y, h1c, h1m valid for the red, green, blue, yellow, cyan, and magenta hue components, and using the second color region data and achromatic data α representing the achromatic component in the color image represented by the first color data in the following formulas:

$$Ro = fh1r + fh1m + fh1y + \alpha$$

$$Go = fh1g + fh1y + fh1c + \alpha$$

$$Bo = fh1b + fh1c + fh1m + \alpha \quad (3).$$

18. The image processing method of claim 14, wherein calculating the second color data comprises taking a weighted sum of the first hue region data and the second hue region data for each hue component.

19. The image processing method of claim 14, further comprising outputting second achromatic data by converting the frequency characteristics of first achromatic data representing the achromatic component in the image represented by the first color data, wherein calculating the second color data comprises outputting the second color data by using the second hue region data and the second achromatic data.

20. The image processing method of claim 14, further comprising:
   outputting an identification code indicating information about hues of colors represented by the first color data; and
   selecting, according to the identification code, second hue region data concerning hues of the colors represented by the first color data; wherein
   the second color data are output by using the selected second hue region data.

21. The image processing method of claim 14, further comprising:
   outputting prescribed matrix coefficients set for each component of the second hue region data; and p1 calculating corrections for correcting the brightness and/or saturation of each hue component of the first color data by performing a matrix calculation including multiplication of the second hue region data by the matrix coefficients, the second hue region data being the data operated on; wherein
   the second color data are calculated from said corrections.

22. The image processing method of claim 21, wherein:
   the second hue region data fh1$r$, fh1$g$, fh1$b$, fh1$y$, fh1$c$, fh1$m$ are obtained by independently converting the frequency characteristics of the first hue region data h1$r$, h1$g$, h1$b$, h1$y$, h1$c$, h1$m$ valid for the red, green, blue, yellow, cyan, and magenta hue components;
   matrix coefficients Fij (i=1 to 3, j=1 to 3) are output; and
   the corrections R1, G1, B1 for the sizes of the red, green, and blue components of the first color data are calculated from the following formula, including an achromatic data term $\alpha$ representing the size of the achromatic component in the color image represented by the first color data:

$$\begin{bmatrix} R1 \\ G1 \\ B1 \end{bmatrix} = (Fij) \begin{bmatrix} fh1r \\ fh1g \\ fh1b \\ fh1c \\ fh1m \\ fh1y \\ \alpha \end{bmatrix}. \quad (6)$$

23. The image processing method of claim 21, further comprising outputting second achromatic data by converting frequency characteristics of first achromatic data representing an achromatic component in the image represented by the first color data, wherein the corrections are calculated by performing a matrix calculation including the second achromatic data as the data operated on.

24. The image processing method of claim 21, further comprising:
   outputting an identification code indicating information about hues of colors represented by the first color data; and
   selecting, according to the identification code, second hue region data concerning hues of the colors represented by the first color data; wherein
   the corrections R1, G1, B1 are calculated by the following formula, using the second hue region data selected by the selection means as the terms h1$p$ and h1$q$:

$$\begin{bmatrix} R1 \\ G1 \\ B1 \end{bmatrix} = (Eij) \begin{bmatrix} h1p \\ h11 \\ \alpha \end{bmatrix}. \quad (8)$$

25. The image processing method of claim 21, wherein converting the frequency characteristics comprises attenuating or eliminating high-frequency components of hue region data valid for a particular hue component.

26. The image processing method of claim 21, wherein converting the frequency characteristics comprises enhancing edge components of hue region data valid for a particular hue component.

* * * * *